United States Patent
Hirota et al.

(10) Patent No.: US 7,473,777 B2
(45) Date of Patent: Jan. 6, 2009

(54) METHOD FOR PRODUCTION OF HALOGEN-CONTAINING PHTHALOCYANINE COMPOUND

(75) Inventors: Kouichi Hirota, Kobe (JP); Yukihide Hashimoto, Kobe (JP); Kiyoshi Masuda, Ushiku (JP); Masunori Kitao, Ushiku (JP)

(73) Assignee: Nippon Shokubai Co., Ltd., Osaka (JP)

( * ) Notice: Subject to any disclaimer, the term of this patent is extended or adjusted under 35 U.S.C. 154(b) by 607 days.

(21) Appl. No.: 11/078,070

(22) Filed: Mar. 11, 2005

(65) Prior Publication Data
US 2005/0203293 A1 Sep. 15, 2005

(30) Foreign Application Priority Data
Mar. 15, 2004 (JP) .............................. 2004-072003

(51) Int. Cl.
*C07B 47/00* (2006.01)
(52) U.S. Cl. .................................................... 540/145
(58) Field of Classification Search ................... 540/145
See application file for complete search history.

(56) References Cited

U.S. PATENT DOCUMENTS

| | | | |
|---|---|---|---|
| 4,557,868 A | 12/1985 | Page et al. | 260/245.89 |
| 6,069,244 A | 5/2000 | Masuda et al. | 540/139 |
| 6,323,340 B1 | 11/2001 | Masuda et al. | 540/128 |
| 2003/0234995 A1 | 12/2003 | Masuda et al. | 359/885 |

FOREIGN PATENT DOCUMENTS

| | | |
|---|---|---|
| EP | 0 823 432 A2 | 2/1998 |
| EP | 0 882 768 A2 | 12/1998 |
| JP | 6-256680 | 9/1994 |
| JP | 7-103318 | 11/1995 |
| JP | 2000-063693 | 2/2000 |
| JP | 2000-169743 | 6/2000 |

*Primary Examiner*—James O. Wilson
*Assistant Examiner*—Paul V. Ward
(74) *Attorney, Agent, or Firm*—Occhiuti Rohlicek & Tsao LLP

(57) ABSTRACT

This invention relates to a method for the production of a halogen-containing phthalocyaline compound by the cyclization of phthalonitrile compounds either singly or in combination with a metal compound, characterized in effecting the cyclization in an organic compound having a hydroxyl group and/or a carboxylic acid in an amount in the range of 0.01-10 mass parts per one mass part of the phthalonitrile compounds while continuing the introduction of an inert gas. This method, by using a solvent capable of serving as a specific oxygen source destined to participate in the reaction of complexing a metal compound introduced into a phthalocyanine dye, permits the production of a phthalocyanine compound inexpensively in a high yield.

12 Claims, No Drawings ated above, this invention has an object to provide a method for producing on a

METHOD FOR PRODUCTION OF HALOGEN-CONTAINING PHTHALOCYANINE COMPOUND

BACKGROUND OF THE INVENTION

1. Field of the Invention

This invention relates to a novel method for the production of a halogen-containing phthalocyanine compound. More particularly, this invention relates to a method for the production of a halogen-containing phthalocyanine compound manifesting the absorption of heat ray and/or the absorption in a near infrared region, excelling in solubility in a solvent, and having excellent light-fastness.

The phthalocyanine compound which is obtained by the method contemplated by this invention excels in a heat ray-absorbing property and, therefore, is useful as a heat ray-absorbing dye. Since the phthalocyanine compound obtained by the method according to this invention absorbs light in a near infrared region having a wavelength in the range of 600-1000 nm, it can manifest excellent effects when it is used as a near infrared absorption dye and a near infrared sensitizer for writing or reading in an optical recording medium using a semiconductor laser, a liquid crystal display device, and an optical character reader, as a photothermal modifier for thermal transfer and a thermal paper, thermal stencil printing, as a near infrared absorption filter as for plasma display panel (PDP), as an asthenopia inhibitor, as a near infrared absorbing material for a photoconductive material, or as a color separation filter for an image pickup tube, as a color filter for liquid crystal display, as a selective absorption filter for a color braun tube, as a color toner, as a toner dye for flash fixing, as an ink jet ink, as an indelible bar code ink, also as a microorganism inactivating agent, as a photosensitive dye for oncotherapy, as a heat ray-shielding agent for automobiles and buildings, and as a discriminating agent for resin sorting.

2. Description of Related Art

The needs for a near infrared absorbent dye have been mounting in consequence of the expansion of the field of the applications thereof. As regards the near infrared absorption dye to be used as a near infrared absorption dye and a near infrared sensitizer for writing or reading in an optical recording medium using a semiconductor laser, a liquid crystal display device, and an optical character reader, as a photothermal modifier for thermal transfer and a thermal paper, thermal stencil printing, as a near infrared absorption filter as for plasma display panel (PDP), as an asthenopia inhibitor, as a near infrared absorbing material for a photoconductive material, or as a color separation filter for an image pickup tube, as a color filter for liquid crystal display, as a selective absorption filter for a color braun tube, as a color toner, as a toner dye for flash fixing, as an ink jet ink, as an indelible bar code ink, also as a microorganism inactivating agent, as a photosensitive dye for oncotherapy, as a heat ray-shielding agent for automobiles and buildings, and as a discriminating agent for resin sorting, methods for the production of materials which satisfy wholly such characteristics as light-fastness, heat-resistance, and solubility (or compatibility with a resin) have been studied hitherto. None of the methods developed to date, however, has proved advantageous for commercial applications.

The methods for producing such phthalocyanine compounds have been disclosed in JP-A-2000-63693, JP-A-2000-169743, JP-B HEI-07(1995)-103318, and U.S. 2003/0234995 A1, for example.

JP-A-2000-69693 discloses a method which comprises inducing the reaction of tetrafluorophthalonitrile with vanadium trichloride by using α-methyl naphthalene or benzonitrile solely while introducing an oxygen-containing gas such as a gas obtained by diluting air into the resultant reaction solution. Since the solvent, α-methyl naphthalene, to be used in this method is very expensive and since the reaction of this method necessitate the introduction of a hot oxygen-containing gas and, therefore, entails a possibility of the introduced gas entraining the expensive solvent and dispersing it outside the reaction system and threatening the danger of explosion, this method hardly deserves to be rated as favorable for commercialization. JP-A-2000-169743 discloses the reaction of tetrafluorophthalonitrile and vanadium trioxide in benzonitrile as a solvent in the presence of paratoluene sulfonic acid and calcium carbonate at 150° C. This official gazette recommends to use as an organic solvent in the reaction an inert substance having no reactivity with the starting materials and the reaction vessel and, for the purpose of preventing the reaction vessel from corrosion, to perform the reaction of a metal oxide and paratoluene sulfonic acid at relatively low temperature. The present inventors' review of this method, however, has revealed that this method is not appropriate because the phthalocyanine compound produced thereby as aimed at occasionally fails to manifest the performance as claimed.

JP-B-HEI 07(1995)-103318 discloses a novel phthalocyanine compound and a method for the production thereof and claims to produce a fluorine-containing phthalocyanine compound by reacting a corresponding phthalonitrile compound with vanadium chloride in an inert solvent or an aprotic solvent. Though only ethylene glycol cited as a reaction solvent is an example of an inert solvent, no other alcohols cannot be found anywhere. The working examples cited therein include the synthesis of phthalocyanine in a current of nitrogen. This synthesis is found to use benzonitrile exclusively as an inert solvent. U.S. 2003/0234995 A1 discloses the reaction of a substituted phthalonitrile compound with vanadium chloride using benzonitrile and octanol under reflux. Since the reaction is effected without using an inert gas such as nitrogen, the yield is as low as 63.2 mol %.

BRIEF SUMMARY OF THE INVENTION

In the light of the problems mentioned above, this invention has an object to provide a method for producing on a commercial scale a halogen-containing phthalocyanine compound, particularly a useful halogen-containing phthalocyanine compound which can be utilized as a heat ray-absorbing dye, a near infrared absorbing dye or the precursor thereof, and a high grade dye in a wide range of fields such as, for example, a heat ray-absorbing dye having an excellent heat ray absorbing property, an optical recording medium manifesting the absorption in a near infrared region and using a semiconductor laser, a liquid crystal display device, a near infrared absorbing dye, a near infrared sensitizer, a photothermal modifier for thermal transfer, a near infrared absorbing material for a near infrared ray absorbing filter, a color separation filter, a color filter for liquid crystal display, an optical color filter, a plasma display color filter, a selective absorbing filter for a color braun tube, a color toner, and an ink jet ink.

This invention has another object to provide a method for producing a phthalocyanine compound inexpensively in a high yield by using a solvent which is capable of serving as a specific oxygen source participating in the complexing reaction of a metal compound introduced into a phthalocyanine dye.

This invention has yet another object to provide a method for producing inexpensively on a commercial scale a phthalocyanine compound usable as a near infrared absorbing dye or the precursor thereof and for the applications cited above by a safer and more favorable procedure without requiring the use of an oxygen-containing gas or some other substance having a possibility of inducing explosion when an oxygen source is necessary for the purpose of promoting the complexing reaction.

The present inventors have made a diligent study with a view to fulfilling the objects mentioned above and have consequently found that, when phthalonitrile compounds represented by the general formulae (1)-(4) shown below are subjected either singly or in combination with a metal compound to the cyclization in a method for producing a halogen-containing phthalocyanine compound represented by the formula (5) shown below, the phthalocyanine compound can be produced in a high yield and the objects of this invention can be accomplished by performing the cyclization in the presence of a specific organic compound or in the presence of the organic compound together with an inert solvent and/or an aprotic organic solvent, while replacing the interior of a reaction vessel with an inert gas during the initiation of the reaction, and continuing the reaction while introducing the inert gas and retaining the state of substantial absence of oxygen. This knowledge has resulted in perfecting this invention.

To be specific, the objects of this invention can be accomplished by a method for producing a halogen-containing phthalocyanine compound represented by the following formula (5):

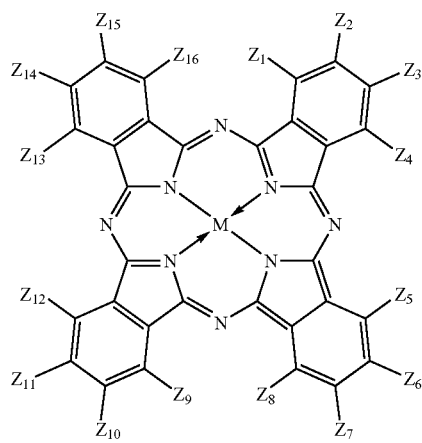

wherein $Z_1$-$Z_{16}$ independently stand for a hydrogen atom, $NHR^1$, $SR^2$, $OR^3$, or a halogen atom, provided that at least one of the $Z_1$-$Z_{16}$ stands for a halogen atom; $R^1$, $R^2$, and $R^3$ independently stand for a phenyl group which may be substituted, an aralkyl group which may be substituted, or an alkyl group of 1-20 carbon atoms which may be substituted; and M stands for a nonmetal, a metal, a metal oxide, or a metal halogenide by subjecting a phthalonitrile compound (1) represented by the following formula (1):

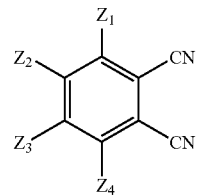

a phthalonitrile compound (2) represented by the following formula (2):

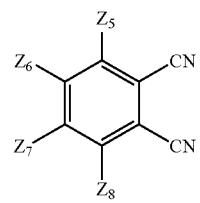

a phthalonitrile compound (3) represented by the following formula (3):

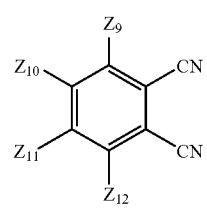

and a phthalonitrile compound (4) represented by the following formula (4):

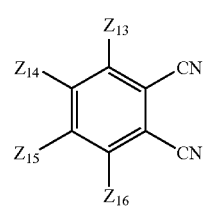

wherein in the formulae (1)-(4), $Z_1$-$Z_6$ independently stand for a hydrogen atom, $NHR^1$, $SR^2$, $OR^3$, or a halogen atom, provided that at least one of the $Z_1$-$Z_{16}$ stands for a halogen atom; $R^1$, $R^2$, and $R^3$ independently stand for a phenyl group which may be substituted, an aralkyl group which may be substituted, or an alky of 1-20 carbon atoms which may be substituted, either singly or in combination with a metal compound to the cyclization, wherein the cyclization is carried out in an organic compound having a hydroxyl group and/or a carboxyl group in an amount of 0.01-10 mass parts based on 1 mass part of the phthalonitrile compounds while introducing an inert gas.

The above and other objects, features, and advantages of the present invention will become clear from the following description of the preferred embodiment.

DESCRIPTION OF THE PREFERRED EMBODIMENTS

This invention is to provide a method for the production of a halogen-containing phthalocyaline compound represented by the following formula (5):

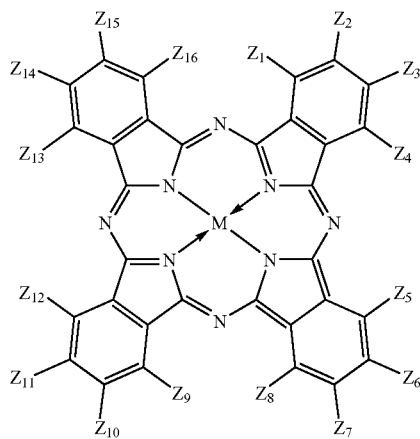

(5)

wherein $Z_1$-$Z_{16}$ independently stand for a hydrogen atom, $NHR^1$, $SR^2$, $OR^3$, or a halogen atom, provided that at least one of the $Z_1$-$Z_{16}$ stands for a halogen atom; $R^1$, $R^2$, and $R^3$ independently stand for a phenyl group which may be substituted, an aralkyl group which may be substituted, or an alkyl group of 1-20 carbon atoms which may be substituted; and M stands for a nonmetal, a metal, a metal oxide, or a metal halogenide by subjecting a phthalonitrile compound (1) represented by the following formula (1):

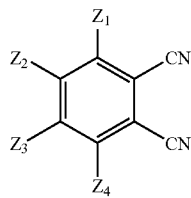

(1)

a phthalonitrile compound (2) represented by the following formula (2):

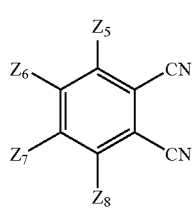

(2)

a phthalonitrile compound (3) represented by the following formula (3):

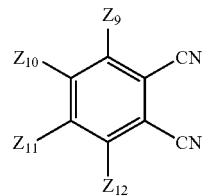

(3)

and a phthalonitrile compound (4) represented by the following formula (4):

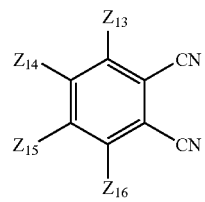

(4)

wherein in the formulae (1)-(4), $Z_1$-$Z_{16}$ independently stand for a hydrogen atom, $NHR^1$, $SR^2$, $OR^3$, or a halogen atom, provided that at least one of the $Z_1$-$Z_{16}$ stands for a halogen atom; $R^1$, $R^2$, and $R^3$ independently stand for a phenyl group which may be substituted, an aralkyl group which may be substituted, or an alky of 1-20 carbon atoms which may be substituted, either singly or in combination with a metal compound to the cyclization, wherein the cyclization is carried out in an organic compound having a hydroxyl group and/or a carboxyl group in an amount of 0.01-10 mass parts based on 1 mass part of the phthalonitrile compounds while introducing an inert gas.

Now, this invention will be described in detail below.

This invention has a feature that the cyclization of the phthalonitrile compounds represented by the formula (1)-(4) (occasionally referred to collectively as "phthalonitrile compounds" herein) either singly or the cyclization of the phthalonitrile compounds with a metal compound is carried out in an organic compound having a hydroxyl group and/or a carboxyl group in an amount of 0.01-10 mass parts based on 1 mass part of the phthalonitrile compounds. By this process, the yield of the halogen-containing phthalocyanine compound aimed at can be improved. The reason for the exalted yield in which the halogen-containing phthalocyanine compound aimed at can be obtained by using the organic compound having a hydroxyl group and/or a carboxyl group remains yet to be elucidated. It, however, can be inferred that the organic compound reacts preferentially with the metal compound as a central metal source to form a complex between the metal compound and the organic compound and the cyclization of the halogen-containing phthalonitrile compound with the metal compound is promoted by the presence of this complex. In addition to the advantage mentioned above, the presence of the organic compound to a certain extent is thought to promote the solubility of the precursor of the phthalocyanine compound (complex) in the solvent thereby promoting the reaction and consequently increasing the yield of the reaction. Further, it is also inferred that when a metal halogenide is used as a central metal source, for example, the compound such as hydrogen halogenide which is formed by the reaction of the organic compound and the metal halogenide acts catalytically on the phthalonitrile compound and further promotes the cyclization. Further, it is inferred that even when a metal halogenide is not used, the compound such as hydrogen halogenide which is formed by the reaction of the organic compound with the halogen which is present in the phthalonitrile compound manifests the same function as mentioned above.

The organic compound having a hydroxyl group and/or a carboxyl group to be used in this invention (occasionally referred to simply as "organic compound" herein) is not limited so long that it has a hydroxyl group and/or a carboxyl group, and a compound capable of dissolving the phthalonitrile compounds represented by the formulae (1)-(4) may be preferably used. As typical examples thereof, alkyl alcohols such as n-butyl alcohol, t-butyl alcohol, isobutyl alcohol, n-pentyl alcohol, n-hexyl alcohol, n-heptyl alcohol, n-octyl alcohol, decyl alcohol, and tridecyl alcohol; aromatic alcohols such as benzyl alcohol, methylbenzyl alcohol, phenetyl alcohol, benzene dimethanol, and naphthol; glycol ethers such as diethylene glycol monomethyl ether, triethylene glycol monomethyl ether, and dipropylene glycol monomethyl ether; aliphatic carboxylic acids such as acetic acid, propionic acid, and butyric acid; and aromatic carboxylic acids such as benzoic acid and naphthoeic acid may be cited. Though these organic compounds may be used either singly or in the form of a mixture of two or more members, it is general to use them singly. Among other organic compounds cited above, the organic compounds of 6-15 carbon atoms are preferable and those having strong hydrophobicity are more preferable. The expression, "an organic compound having a hydroxyl group and/or a carboxyl group" as used herein is referred to as an organic compound having at least either a hydroxyl group or a carboxyl group. More specifically, the organic compound according to this invention may be a compound having both a hydroxyl group and a carboxyl group in its molecule such as glyoxalic acid and glycol ether having a carboxyl group. Particularly advantageously, n-hexyl alcohol, n-heptyl alcohol, n-octyl alcohol, benzyl alcohol, naphthol, diethylene glycol monomethyl ether, triethylene glycol monomethyl ether, benzoic acid, and butyric acid are used. Especially when the phthalonitrile compound is such a phthalonitrile compound as tetrafluorophthalonitrile which has halogen atoms exclusively, it is commendable to use such an organic compound as n-octyl alcohol alone. When a phthalonitrile compound haivng another substituent (s) ($NHR^1$, $SR^2$, and $OR^3$) is used as the raw maaterial, it is commendable to perform the cyclization in the organic compound in combination with an inert solvent and/or an aprotic solvent which will be described specifically herein below.

The amount of the organic compound to be used is in the range of 0.01-10 mass parts, preferably in the range of 0.02-7.5 mass parts, more preferably in the range of 0.05-5 mass parts, and particularly preferably in the range of 0.1-3 mass parts. If the amount of the organic compound to be used falls short of the lower limit, the shortage would possibly result in preventing the cyclization from proceeding efficiently, preventing the precursor of the produced phthalocyanine (complex) from exhibiting sufficient solubility in the solvent, and degrading the yield of the produced halogen-containing phthalocyanine compound aimed at. Besides, the shortage of the amount of the organic compound naturally adds proportionately to the slurry concentration and possibly results in rendering the agitation during the course of the reaction difficult, necessitating a special stirring device, impairing the efficiency of agitation, and preventing the reaction from proceeding uniformly. Conversely, if the organic compound is used in excess of the upper limit, the overage would be at an economic disadvantage in possibly degrading the productivity and lowering the speed of the reaction as well. This invention allows the organic compound to be introduced wholly at once at the time of charging the reaction system or to be introduced continuously or in fractional amounts during the course of the reaction. The organic compound may be used singly as an organic solvent.

Further, in the method of this invention, the cyclization is preferably carried out in the presence of an inert solvent and/or an aprotic organic solvent in addition to the organic compound having a hydroxyl group and/or a carboxylic group. This co-presence of the inert solvent and/or the aprotic organic solvent is at an advantage in enabling the cyclization to proceed smoothly with the organic compound used in a comparatively small amount and causing the phthalonitrile compound as the raw material and the precursor thereof to be dissolved and consequently promoting the reaction. Incidentally, the inert solvent and the aprotic organic solvent may be used either singly or in the form of a mixture of two or more members. Further, the inert solvent and the aprotic organic solvent may be used in proper combination. In consideration of the ease of the operation and the convenience of the purification after the reaction and the recovery of the used solvent, it is commendable to use the inert organic solvent or the aprotic organic solvent singly.

The inert solvent or the aprotic polar solvent which can be used together with the organic compound having a hydroxyl group and/or a carboxyl group in this invention does not need to be particularly restricted but is only required to fulfill the effects mentioned above. It is preferred to be an aromatic compound having a boiling point of not lower than 150° C. The inert solvent may be any of the inert solvents which exhibit low reactivity and preferably no reactivity with the phthalonitrile compound as the starting material. For example, benzene, toluene, xylene, nitrobenzene, monochlorobenzene, dichlorobenzene, trichlorobenzene, chloronathphalene, methyl naphthalene, and benzonitrile may be preferably used. The term "inert" as used herein is referred to be inert against the reaction involved in this invention. The aprotic polar solvent may be any of the solvents which are aprotic and polar, and also exhibit low reactivity and preferably no reactivity with the phthalonitrile compound as the starting material. For example, pyridine, N,N-dimethyl formamide (DMF), N-methyl-2-pyrrolidinone, N,N-dimethyl acetoamide, triethyl amine, tri-n-butyl amine, dimethyl sulfoxide, and sulfolane may be preferably used. Among other examples cited above, benzonitrile, nitrobenzene, dichlorobenzene, trichlorobenzene, chloronaphthalene, methyl naphthalene, and N,N-dimethylformamide prove preferable, and nitrobenzene, dichlorobenzene, trichlorobenzene, chloronaphthalene, methyl naphthalene, benzonitrile, and N,N-dimethyl formamide prove more preferable, and benzonitrile, N,N-dimethyl formamide, and chloronaphthalene prove particularly preferable. Incidentally, the inert solvent and the aprotic organic solvent mentioned above may be used either singly or in the form of a mixture of two or more members. It is further permissible to use the inert solvent and the aprotic organic solvent in proper combination. In consideration of the ease of the operation and the convenience of the purification after the reaction and the recovery of the used solvent, however, it is commendable to use the inert solvent or the aprotic organic solvent singly. In this invention, the solvent which can be used in combination with the organic solvent having a hydroxyl group and/or a carboxyl group may be a solvent which is an inert and aprotic organic solvent. One example of such a solvent is benzonitrile.

In the case of using the inert solvent and/or the aprotic organic solvent in combination with the organic compound having a hydroxyl group and/or a carboxyl group, the mixing ratio of the organic compound having a hydroxyl group and/or a carboxyl group and the inert solvent and/or the aprotic organic solvent does not need to be particularly restricted but is only required to promote the cyclization satisfactorily. As described above, it varies with the kind and number of the substituents contained in the phthalonitrile compound as the raw material. The total amount of the inert solvent and the aprotic organic solvent is preferably in the range of 0.01-50 mass parts, more preferably in the range of 0.05-40 mass parts, and particularly preferably in the range of 0.1-30 mass parts, based on 1 mass part of the organic compound. If the total amount of the inert solvent and the aprotic organic solvent falls short of 0.01 mass part based on 1 mass part of the organic compound, the shortage would possibly result in preventing the effects by the inert solvent and the aprotic organic solvent from being fully manifested and keeping the cyclization from proceeding satisfactorily from the commercial point of view. Conversely, if the total amount exceeds 50 mass parts, the excess would bring no discernible proportionate addition to the effects and result in preventing the organic compound from manifesting satisfactory effects and impeding efficient progress of the cyclization, imparting no satisfactory solubility in the solvent to the precursor of the produced phthalocyanine compound (complex), and possibly lowering the yield of the halogen-containing phthalocyanine compound aimed at. In this invention, the inert solvent and the aprotic organic solvent are a solvent different from the organinc solvent having a hydroxyl group and/or a carboxyl group as mentioned above.

Another feature of this invention is that the cyclization is carried out while introducing an inert gas in a reaction vessel the interior of which has been preferably replaced with an inert gas. By this process, the halogen-containing phthalocyanine compound aimed at can be produced in a high yield with excellent quality. The reason for the successful acquisition of the target compound in a high yield with excellent quality by the cyclization performed in the substantial absence of oxygen within the reaction vessel remains yet to be elucidated. It, however, can be inferred that the presence of oxygen in the reaction vessel would dispose the metal compound as a metal source to ready oxidation and consequently convert it into a metal oxide assuming a comparatively stable state and, as a result, degrade the solubility of the metal compound in the organic compound and not merely lower the contact efficiency with the phthalonitrile compound as the raw material and decrease the speed of the ordinary reaction but also induce the secondary reaction, lower the selectivity of the reaction and give rise to a by-product, and entail such unfavorable situations as a decline of the yield. On the other hand, it may be inferred that when the interior of the reaction vessel is replaced with the inert gas, the reaction between the elemental oxygen in the organic compound having the hydroxyl group and/or the carboxyl group and the metal compound occurs preferentially and, as a result, the product by the reaction between the metal compound and the organic compound assumes an activated state allowing comparatively easy dissolution in the reaction solvent and exhibiting a properly oxidized state and consequently promotes the cyclization and gives good results of the reaction. Conversely, in an atmosphere allowing the presence of oxygen such as in the presence of excess oxygen or in an ordinary open air, the metal compound induces an activated state only with difficulty and eventually lowers the efficiency of the cyclization. Further, the replacement of the interior of the reaction vessel with the inert gas succeeds in keeping the oxygen-containing gas out of the danger of explosion and enabling the cyclization to proceed more safely and efficiently. It is, therefore, important to carry out the cyclization while introducing an inert gas as in accordance with the method of this invention, and more preferably controlling this introduction of the inert gas so that the oxygen concentration in the gas phase part exposed to the reaction solution during the course of the reaction may reach a level of not more than 10 vol % as will be described in detail herein below. It may be inferred that when the phthalocyanine compound is a nonmetal, the action of promoting the cyclization is operating between the organic compound having the hydroxyl group and/or the carboxyl group and the phthalonitrile compound as the raw material. When a metal halogenide is used as the central metal source, for example, the compound formed by the reaction of the organic compound with the metal halogenide is thought to function as the active species. It may be further inferred that the hydrogen halogenide which is generated in this case catalytically acts on the phthalonitrile compound and further promotes the cyclization.

The inert gas which can be used in this case does not need to be particularly restricted but is only required to be inactive for the cyclization contemplated by this invention. As typical examples of the inert gas, nitrogen gas, helium gas, argon gas, and carbon dioxide gas may be cited. Among other inert gases cited above, nitrogen gas proves particularly favorable.

The oxygen concentration in the reaction vessel after the interior of the reaction vessel has been replaced with the inert gas is such that the oxygen concentration in the gas phase part exposed to the reaction solution during the course of the reaction may be not more than 10 vol % and may fall preferably in the range of 0-7 vol %, more preferably in the range of 0-5 vol %, and most preferably in the range of 0-3 vol %. In this case, if the oxygen concentration exceeds 10 vol %, the overage would result in not only lowering the speed of the cyclization and lowering the yield of the phthalocyanine compound aimed at but also possibly jeopardizing the safety as by suffering the organic solvent in use to fall in the range of explosion. Even when the raw material solution entrains dissolved oxygen, it is commendable to have the oxygen concentration in the solution adjusted to fall in the range of oxygen concentration mentioned above as by bubbling the solution additionally. Incidentally, the statement that the oxygen concentration is 0 vol % indicates the state of the interior of the reaction vessel which has been completely replaced with the inert gas.

As examples of the method for replacing the interior of the reaction vessel with the inert gas, such methods of lowering the oxygen concentration to a necessary level as a method which consists in feeding the insert gas to the reaction vessel till the oxygen concentration in the reaction vessel reaches such a sufficiently low level as mentioned above and a method which consists in repeating a procedure of feeding the inert gas to the reaction vessel till the interior of the reaction vessel assumes a pressed state and then depressing the reaction vessel to normal pressure may be cited. The replacement otherwise may be implemented even during the course of the reaction by finally measuring the oxygen concentration in the reaction vessel (the oxygen concentration of the gas phase part exposed to the reaction solution during the course of the reaction) by the use of an oxygen concentration meter, for example. The flow rate of the inert gas does not need to be particularly restricted but is only required to keep the oxygen concentration in the reaction vessel from exceeding 10 vol %.

When the reaction vessel is fitted with a cooling tube, for example, the linear speed of the insert gas relative to the cross sectional area of the connecting part between the reaction vessel and the cooling tube is in the range of 0.01-10 cm/sec, preferably in the range of 0.1-5 cm/sec, and more preferably in the range of 0.2-3 cm/sec. If the linear speed falls short of 0.01 cm/sec, the shortage would result in rendering the reaction unfavorable as by preventing the replacement with the inert gas from becoming sufficient. If the linear speed exceeds 10 cm/sec, the overage would possibly render the commercial operation unfavorable by suffering the solvent used for the reaction to be scattered.

The metal compound to be used by the method of this invention does not need to be particularly restricted but is only required to induce the cyclization of the phthalonitrile compound and produce the phthalocyanine compound aimed at. As typical examples of the metal compound, metal, metal oxide, metal carbonyl, metal halogenides, and organic acid metals may be cited. These metal compounds may be used either singly or in the form of a mixture of two or more members. It can be properly selected to suit the structure of the phthalocyanine compound aimed at. The metal compound has a metal which corresponds to the moiety represented by the symbol "M" in the phthalocyanine compound of the formula (5) which is obtained after the reaction. As typical examples of the metal compound, metals such as iron, copper, zinc, vanadium, titanium, indium, magnesium, and tin; metal halogenides such as chlorides, bromides, and iodides of these metals, for example, vanadium chloride, titanium chloride, copper chloride, zinc chloride, cobalt chloride, nickel chloride, iron chloride, indium chloride, aluminum chloride, tin chloride, gallium chloride, germanium chloride, magnesium chloride, copper iodide, zinc iodide, cobalt iodide, indium iodide, aluminum iodide, gallium iodide, copper bromide, zinc bromide, cobalt bromide, aluminum bromide, and gallium bromide; metal oxides such as vanadium monoxide, vanadium trioxide, vanadium tetroxide, vanadium pentoxide, titanium dioxide, iron monoxide, iron sesquioxide, ferrosoferric oxide, manganesse oxide, nickel monoxide, cobalt monoxide, cobalt sesquioxide, cobalt dioxide, cuprous oxide, cupric oxide, copper sesquioxide, palladium oxide, zinc oxide, germanium monoxide, and germanium dioxide; organic acid metals such as copper acetate, zinc acetate, cobalt acetate, copper benzoate, and zinc benzoate; and complex compounds such as acetyl acetonate and metal carbonyls such as cobalt carbonyl, iron carbonyl, and nickel carbonyl may be cited. Among other metal compounds cited above, metals, metal oxides, and metal halogenides are preferably used and vanadium chloride and copper chloride are used particularly preferably. When vanadium chloride or copper chloride is used, the center metal is vanadium or copper, respectively.

The cyclization contemplated by this invention can be carried out in the same manner as any of the methods known popularly, except that the cyclization is performed in the presence of an organic compound having a hydroxyl group and/or a carboxyl group while the introduction of an inert gas is continued during the course of the reaction. The conditions for the reaction of the phthalonitrile compound and the metal compound do not need to be particularly restricted but are only required to advance the reaction. The organic compound may be charged in the reaction system, for example, in the amount in the range of 0.01-10 mass parts, preferably in the range of 0.02-7.5 mass parts, and more preferably in the range of 0.05-5 mass parts, based on 1 mass part of the phthalonitrile compound. The metal compound may be charged in the reaction system, for example, in the amount in the range of 1-3 mols and preferably in the range of 1.05-2 mols, based on 4 mols of the phthalonitrile compound. The reaction temperature may be in the range of 80-250° C., preferably in the range of 100-220° C., and more preferably in the range of 120-200° C. If this reaction temperature is unduly low, the shortage would result in greatly lowering the reaction speed and rendering the reaction impractical. Conversely, if the reaction temperature is unduly high, the overage would result in readily inducing the secondary reaction and lowering the yield of the target product. The reaction time may be in the range of 0.1-24 hours, preferably in the range of 0.5-20 hours, and more preferably in the range of 1-18 hours. After the reaction, by filtering, washing, and drying the reaction product by following the procedure of the heretofore known method for the production of phthalocyanine compound, the phthalocyanine compound can be obtained in a high yield with a high purity.

Now, the phthalonitrile compounds of the formulae (1)-(4) to be used as raw materials in this invention and the phthalocyanine compound of the formula (5) to be produced therefrom will be explained below.

The phthalonitrile compounds represented by the formula (1)-(4) and used in this invention are a phthalonitrile having at least one halogen atom contained in a benzene ring thereof or a phthalonitrile in which a phenyl group which may be substituted, an aralkyl group which may be substituted, or an alkyl group of 1-20 carbon atoms which may be substituted is bound thereto via a nitrogen, oxygen or sulfur atom. The reaction may be carried out by using one kind or different kinds of phthanolitriles. In this case, by performing this reaction in the presence of a metal compound and an organic compound having a hydroxyl group and/or a carboxyl group while continuing the introduction of an inert gas during the course of the reaction so as to induce the incorporation of at least one halogen atom in the phthalocyanine skeleton, a halogen atom-containing phthalocyanine compound represented by the formula (5) can be produced.

In the aforementioned formulae (1)-(4), $Z_1$-$Z_4$, $Z_5$-$Z_8$, $Z_9$-$Z_{12}$, and $Z_{13}$-$Z_{16}$ stand for a hydrogen atom, $NHR^1$, $SR^2$, $OR^3$, or a halogen atom. In this case, $Z_1$-$Z_4$, $Z_5$-$Z_8$, $Z_9$-$Z_{12}$, and $Z_{13}$-$Z_{16}$ may be independently identical or different. At least one of the groups, $Z_1$-$Z_4$, $Z_5$-$Z_8$, $Z_9$-$Z_{12}$, and $Z_{13}$-$Z_{16}$, is a halogen atom. $R^1$, $R^2$ and $R^3$ independently stand for a phenyl group which may be substituted, an aralkyl group which may be substituted, or an alkyl group of 1-20 carbon atoms which may be substituted. In this case, $R^1$, $R^2$, and $R^3$ may be identical or different. When the formula (1) has a plurality of $R^1$'s, the $R^1$'s may be identical or different. This rule similarly applies to the substituents, $R^2$ and $R^3$, when the formula (1) has a plurality of $R^2$'s and $R^3$'s. This definition for the formula (1) similarly applies to the formulae (2)-(4).

Then, in the formula (5), $Z_1$-$Z_{16}$ independently stand for a hydrogen atom, $NHR^1$, $SR^2$, $OR^3$, or a halogen atom and at least one of them is a halogen atom. In the formula (5), it is preferable that all the groups, $Z_1$, $Z_4$, $Z_5$, $Z_8$, $Z_9$, $Z_{12}$, $Z_13$, and $Z_{16}$ (otherwise called as "substituents at eight α positions of the phthalocyanine ring") are halogen atoms and 0-8 members of the groups, $Z_2$, $Z_3$, $Z_6$, $Z_7$, $Z_{10}$, $Z_{11}$, $Z_14$, and $Z_{15}$ (otherwise called as "substituents at eight β positions of the phthalocyanine ring") are halogen atoms. Alternatively, it is preferable that 1-7 members of the substituents at the α positions are halogen atoms, more preferably, that 1-4 members of the substituents at the α positions are halogen atoms and four members thereof are $OR^3$. In the substituents at the β positions in this case, at least one substituent preferably stands for $SR^2$, more preferably not less than four substituents stand for $SR^2$, and particularly preferably all the eight substituents stand for $SR^2$. By the introduction of such an electron donar group as $SR^2$, the phthalocyanine compound is enabled to increase the absorption wavelength, particularly enjoy a good transmission of visible ray, and acquire selective absorption capacity of the near infrared ray. Then, $R^1$, $R^2$, and $R^3$ have the same definitions as in the foregoing formulae (1)-(4).

In the formula (5), M stands for a nonmetal, a metal, a metal oxide, or a metal halogenide. The term "nonmetal" as used herein means a nonmetal having no metal at the center, namely the presence of two hydrogen atoms in place of the center metal. As typical examples of the metal, iron, magnesium, nickel, cobalt, copper, palladium, zinc, vanadium, titanium, indium and tin may be cited. As typical examples of the metal oxide, titanyl, vanadyl, cobalt carbonyl, and iron carbonyl may be cited. As typical examples of the metal halogenide, aluminum chloride, indium chloride, germanium chloride, tin(II) chloride, tin(IV) chloride, silicon chloride, gallium chloride, dichlorogermanium, indium iodide, aluminum iodide, and gallium iodide may be cited. Metals, metal oxides, and metal halogenides may be preferably used. Copper, zinc, cobalt, nickel, iron, vanadyl, titanyl, indium chloride, and tin(II) chloride may be preferably used and copper, zinc, cobalt, vanadyl, and tin(II) chloride may be more preferably used.

As typical examples of the aralkyl group in $R^1$, $R^2$, and $R^3$, benzyl group, phenethyl group, and diphenylmethyl group may be cited, though not exclusively.

Then, as typical examples of the substituent which is optionally present in the phenyl group or the aralkyl group, halogen atoms, acyl groups, alkyl groups, phenyl group, alkoxyl groups, halogenated alkyl goups, halogenated alkoxy groups, nitro group, amino groups, alkyl amino groups, alkylcarbonyl amino groups, aryl amino groups, arylcarbonyl amino groups, alkoxycabonyl goups, alkyl amino carbonyl groups, alkoxy sulfonyl groups, alkylthio groups, carbamoyl groups, aryloxy carbonyl groups, oxyalkyl ether groups, and cyano group may be cited, though not exclusively. One-five substituents may be substituted in the phenyl group or the aralkyl group. When a plurality of such substituents are used, their kinds may be the same or different. Now, part of the substituents will be described more specifically below by citing typical examples thereof.

The term "halogen atom" as used herein refers to a fluorine atom, a chloride atom, a bromine atom, and an iodine atom, preferably a fluorine atom or a chlorine atom, and more preferably a fluorine atom.

Then, the phenyl group or aralkyl group may be substituted or unsubstituted. In the substituents which are optionally present when the phenyl group or the aralkyl group has a substituent, the acyl group include acetyl group, ethyl carbonyl group, propyl carbonyl group, butyl carbonyl group, pentyl carbonyl group, hexyl carbonyl group, benzoyl group, and p-t-butylbenzoyl group. Among other examples cited above, ethyl carbonyl group is favorable.

In the substituents which are optionally present in the phenyl group or aralkyl group, the alkyl group is a linear, branched, or cyclic alkyl group of 1-20 carbon atoms and preferably a linear, branched, or cyclic alkyl group of 1-8 carbon atoms. As typical examples thereof, methyl group, ethyl group, n-propyl group, isopropyl group, n-butyl group, isobutyl group, sec-butyl group, tert-butyl group, n-pentyl group, isopentyl group, neopentyl group, 1,2-dimethylpropyl group, n-hexyl group, cyclohexyl group, 1,3-dimethylbutyl group, 1-isopropylpropyl group, 1,2-dimethylbutyl group, n-heptyl group, 1,4-dimethylpentyl group, 2-methyl-1-isopropylpropyl group, 1-ethyl-3-methyl group, n-octyl group, and 2-ethylhexyl group may be cited. Among other alkyl groups cited above, methyl group and ethyl group are favorable.

In the substituents which are optionally present in the phenyl group or aralkyl group, the alkoxyl group is a linear, branched, or cyclic alkoxyl group of 1-20 carbon atoms and preferably a linear, branched, or cyclic alkoxyl group of 1-8 carbon atoms. As typical examples thereof, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, 1,2-dimethyl-propoxy group, n-hexyloxy group, cyclohexyloxy group, 1,3-dimethylbutoxy group, and 1-isopropylpropoxy group may be cited. Among other alkoxy groups cited above, methoxy group and ethoxy group are favorable.

In the substituents which are optionally present in the phenyl group or aralkyl group, the halogenated alkyl group is a partially halogenated linear, branched, or cyclic alkyl group of 1-20 carbon atoms and preferably a partially halogenated linear, branched, or cyclic alkyl group of 1-8 carbon atoms. As typical examples thereof, chloromethyl group, bromomethyl group, trifluoromethyl group, chloroethyl group, 2,2,2-trichloroethyl group, bromoethyl group, chloropropyl group, and bromopropyl group may be cited.

In the substituents whcih are optionally present in the phenyl group or aralkyl group, the halogenated alkoxyl group is a partially halogenated linear, branched, or cyclic alkoxyl group of 1-20 carbon atoms and preferably a partially halogenated linear, branched, or cyclic alkoxyl group of 1-8 carbon atoms. As typical examples thereof, chloromethoxy group, bromomethoxy group, trifluoromethoxy group, chloroethoxy group, 2,2,2-trichloroethoxy group, bromoethoxy group, chloropropoxy group, and bromopropoxy group may be cited.

In the substituents whcih are optionally present in the phenyl group or aralkyl group, the alkylamino group is an alkylamino group of 1-20 carbon atoms and preferably an alkylamino group of 1-8 carbon atoms. As typical examples thereof, methylamino group, ethylamino group, n-propylamino group, n-butylamino group, sec-butylamino group, n-pentylamino group, n-hexylamino group, n-heptylamino group, n-octylamino group, and 2-ethylhexylamino group may be cited. Among other alkylamino groups cited above, methylamino group, ethylamino group, n-propylamino group, and n-butylamino group are favorable.

In the substituents whcih are optionally present in the aforementioned phenyl group or aralkyl group, the alkylcarbonylamino group is an alkylcarbonylamino group having an alkyl moiety of 1-20 carbon atoms and preferably an alkylcarbonylamino group having an alkyl moiety of 1-8 carbon atoms. As typical examples thereof, methylcarbonylamino group, ethylcarbonylamino group, n-propylcarbonylamino group, n-butylcaarbonylamino group, sec-butylcarbonylamino group, n-pentylcarbonylamino group, n-hexylcarbonylamino group, n-heptylcarbonylamino group, n-octylcarbonylamino group, and 2-ethylhexylcarbonylamino group may be cited. Among other alkylcarbonylamino groups cited above, methylcarbonylamino group, ethylcarbonylamino group, n-propylcarbonylamino group, and n-butylcarbonylamino group are favorable.

In the substituents which are optionally present in the phenyl group or aralkyl group, the alkylaminocarbonyl group is an alkylaminocarbonyl group which has the same alkyl group as in the aforementioned alkylcarbonylamino group.

In the substituents which are optionally present in the phenyl group or aralkyl group, the alkoxycarbonyl group is an alkoxycarbonyl of 1-8 carbon atoms, preferably of 1-5 carbon atoms which may optionally contain a hetero atom in the alkyl moiety of the alkoxyl group, or a cyclic alkoxylcarbonyl of 3-8 carbon atoms, preferably of 5-8 carbon atoms which may optionally contain a hetero atom. As typical examples thereof, methoxycarbonyl group, ethoxycarbonyl group, n-propoxycarbonyl group, isopropoxycarbonyl group, n-butoxycarbonyl group, isobutoxycarbonyl group, sec-butoxycarbonyl group, and tert-butoxycarbonyl group may be cited. Among other alkoxycarbonyl groups cited above, methoxycarbonyl group and ethoxycarbonyl group are favorable.

In the substituents which are optionally present in the phenyl group or aralkyl group, the alkoxysulfonyl group is an alkoxysulfonyl group having an alkyl moiety of 1-20 carbon atoms and preferably an alkoxysulfonyl group having an alkyl moiety of 1-8 carbon atoms.

In the substituents which are optionally present in the phenyl group or aralkyl group, the alkylthio group is an alkylthio group having an alkyl moiety of 1-20 carbon atoms and preferably an alkylthio group having an alkyl moiety of 1-8 carbon atoms.

In the substituents which are optionally present in the phenyl group or aralkyl group, the oxyalkylether group is an oxyalkylether group having an alkyl moiety of 1-20 carbon atoms and preferably an oxyalkylether group having an alkyl moiety of 1-8 carbon atoms.

In the groups, $R^1$, $R^2$, and $R^3$, the unsubstituted alkyl group of 1-20 carbon atoms may be a linear, branched, or cyclic alkyl group of 1-20 carbon atoms and preferably a linear, branched, or cyclic alkyl group of 1-8 carbon atoms. As typical examples thereof, methyl group, ethyl group, n-propyl group, isopropyl group, n-butyl group, isobutyl group, sec-butyl group, tert-butyl group, n-pentyl group, isopentyl group, neopentyl group, 1,2-dimethyl propyl group, n-hexyl group, cyclohexyl group, 1,3-dimethylbutyl group, 1-isopropylpropyl group, 1,2-dimethylbutyl group, n-heptyl group, 1,4-dimethylpentyl group, 2-methyl-1-isopropylpropyl group, 1-ethyl-3-methylbutyl group, n-octyl group, and 2-ethylhexyl group may be cited. Among other unsubstituted alkyl groups cited above, methyl group, ethyl group, n-propyl group, isopropyl group, and n-butyl group are favorable.

As typical examples of the substituent which is optionally present in the alkyl group of 1-20 carbon atoms, halogen atoms, alkoxyl groups, hydroxyalkoxyl groups, alkoxyalkoxyl groups, halogenated alkoxyl groups, nitro group, amino groups, alkylamino groups, alkoxycarbonyl groups, alkylaminocarbonyl groups, and alkoxysulfonyl groups may be cited, though not exclusively. When a plurality of substitutions are preasent, the kinds of these substituents may be identical or different. The more typical examples of these substituents may be as defined in the typical examples of the substituents which are optionally present in the phenyl group or the aralkyl group as mentioned above and, therefore, will be omitted here.

The halogen-containing phthalocyanine compound to be produced by the method of this invention has various uses representing a heat ray absorbing dye and, by selecting a suitable substituent among those cited above, the function aimed at can be attained. When it is intended to be used as a heat ray absorbing dye, for example, it is particularly favorable to use as the raw material such a phthalonitrile compound as to produce a phthalocyanine compound (claim 8) of the formula (5) wherein all the groups, $Z_1$, $Z_4$, $Z_5$, $Z_8$, $Z_9$, $Z_{12}$, $Z_{13}$, and $Z_{16}$ (otherwise called as "substituents at eight α positions of the phthalocyanine ring") are halogen atoms and 0-8 members of the groups, $Z_2$, $Z_3$, $Z_6$, $Z_7$, $Z_{10}$, $Z_{11}$, $Z_{14}$, and $Z_{15}$ (otherwise called as "substituents at eight β positions of the phthalocyanine ring") are halogen atoms.

The phthalonitrile compounds which can be preferably used as the raw material for the production of such a phthalocyanine compound include those which are represented by the following formula (6):

In the formula (6), —CN stands for a nitrile group, X stands for a halogen atom, F stands for a fluorine atom, Y stands for the following substituent (a), (b), (c), (d), (e), (f), or (g), m is 0, 1, or 2, and n is 0, 1, or 2, provided that $0 \leq m+n \leq 2$.

In the formula (6), the substituent (a) is a substituted or unsubstituted phenoxy group of the following formula:

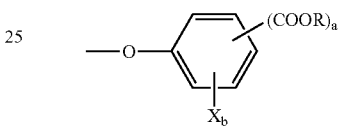

In this formula, R stands for an alkyl group of 1-8 carbon atoms and preferably of 1-4 carbon atoms, X stands for a halogen atom, preferably a fluorine atom or a chlorine atom, and a and b independently are an integer of 0-5, provided that $0 \leq a+b \leq 5$. As typical examples of this substituent (a), o-methoxycarbonyl phenoxy group, m-methoxycarbonyl phenoxy group, p-methoxycarbonyl phenoxy group, o-ethoxycarbonyl phenoxy group, m-ethoxycarbonyl phenoxy group, p-ethoxycarbonyl phenoxy group, o-butoxycarbonyl phenoxy group, m-butoxycarbonyl phenoxy group, p-butoxycarbonyl phenoxy group, o-methyl-p-methoxycarbonyl phenoxy group, o-methoxy-p-ethoxycarbonyl phenoxy group, o-fluoro-p-methoxycarbonylphenoxy group, tetrafluoro-p-ethoxycarbonylphenoxy group, o-ethoxycarbonyl-p-methylphenoxy group, o-butoxycarbonyl-p-methylphenoxy group, o-butoxy-carbonyl-p-fluorophenoxy group, p-methyl-m-butoxycarbonylphenoxy group, and 2,5-dichlorophenoxy group may be cited.

In the formula (6), the substituent (b) is a substituted or unsubstituted phenylthio group of the following formula:

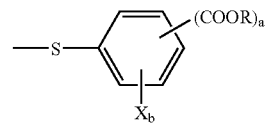

In this formula, R stands for an alkyl group of 1-8 carbon atoms, preferably 1-4 carbon atoms, X stands for a halogen atom, preferably a fluorine atom or a chlorine atom, and a and b independently are an integer of 0-5, provided that $0 \leq a+b \leq 5$. As typical examples of this substituent (b), o-methoxycarbonylphenmylthio group, m-methoxycarbonylphenmylthio group, p-methoxycarbonylphenylthio group, o-ethoxycarbonyphenylthio group, m-ethoxycarbonylphenylthio group, p-ethoxycarbonylphenylthio group, o-butoxycarbonylphenylthio group, m-butoxycarbonylphenylthio group, p-butoxycarbonylphenyl-thio group, o-methyl-p-methoxycarbonylphenylthio group, o-methoxy-p-methoxycarbonylphenylthio group, o-fluoro-p-methoxycarbonylphenylthio group, tetrafluoro-p-ethoxycarbonylphenylthio group, o-ethoxycarbonyl-p-methylphenylthio group, o-butoxycarbonyl-p-methylphenylthio group, o-butoxycarbonyl-p-fluorophenylthio group, and p-methyl-m-butoxycarbonylphenylthio group may be cited.

In the formula (6), the substituted group (c) is a substituted or unsubstituted anilino group of the following formula:

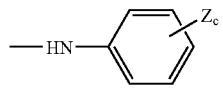

In theis formula, Z stands for an alkyl group of 1-4 carbon atoms, an alkoxy group of 1-4 carbon atoms, a halogen atom, and an alkoxycarbonyl group of 1-4 carbon atoms and c is 0, 1, or 2. As typical examples of this substituted group (c), anilino group, o-toluidino group, m-toluidino group, p-toluidino group, 2,4-xylidino group, 2,6-xylidino group, o-methoxyanilino group, m-methoxyanilino group, p-methoxyanilino group, o-fluoroanilino group, m-fluoroanilino group, p-fluoroanilino group, tetrafluoroanilino group, and p-ethoxycarbonylanilino group may cited.

In the formula (6), the substituted group (d) is an alkoxy group substituted with an alkylamino group of the following formula:

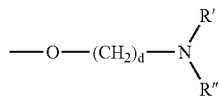

In this formula, R' and R" independently stand for an alkyl group of 1-8 carbon atoms and d is an integer of 1-8. As typical examples of this substituent (d), dimethylaminoethoxy group, diethylaminoethoxy group, and diethylaminobutoxy group may be cited.

In the formula (6), the substituent (e) is an alkylthio group substituted with an alkylamino group of the following formula:

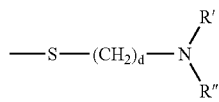

In this formula, R' and R" independently stand for an alkyl group of 1-8 carbon atoms, preferably 1-4 carbon atoms, and d is an integer of 1-8. As typical examples of this substituted group (e), dimethylaminoethylthio group, diethylaminoethylthio group, and dibutylaminobutylthio group may be cited.

In the formula (6), the substituted group (f) is a substituted or unsubstituted alkylamino group of the following formula:

In this formula, e is an integer of 0-7, preferably 0-4, and the alkylene group and/or the alkyl group may be independently substituted with at least one group selected from the group consisting of alkyl groups of 1-4 carbon atoms, alkoxy groups of 1-4 carbon atoms, and alkoxycarbonyl groups of 1-4 carbon atoms. As typical examples of this substituent (f), methylamino group, ethylamino group, and butylamino group may be cited.

In the formula (6), the substituent (g) is a substituted alkoxy group of the following formula:

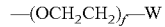

In this formula, W stands for an alkoxy group or an acyl group of 1-4 carbon atoms, preferably 1-2 carbon atoms, and f is an integer of 1-6, preferably 1-4. As typical examples of this substituent (g), methoxyethoxy group, 3',6',9'-oxadecyl oxy group, 3',6',9',12'-oxatridecyl oxy group, acetylethox, 5'-acetyl-3'-oxapentylox, and 8'-acetyl-3',6'-oxaoctyl oxy group may be cited.

Among other phthalonitrile compounds of these formulae (1)-(4), phthalonitrile compounds having at least one fluorine atom, speccifically tetrafluorophthalonitrile, 3,5,6-trifluoro-4-methoxycarbonylphenoxyphthalonitrile, 3,5,6-trifluoro-4-ethoxycarbonylphenoxyphthalonitrile, 3,5,6-trifluoro-4-butoxycarbonylphenoxyphthalonitrile, 3,5,6-trifluoro-4-(o-methyl-p-methoxycarbonylphenoxy)phthalonitrile, 3,5,6-trifluoro-4-(o-fluoro-p-methoxycarbonylphenoxy) phthalonitrile, 3,5,6-trifluoro-4-(o-methoxy-p-ethoxycarbonylphenoxy)phthalonitrile, 3,5,6-trifluoro-4-(tetrafluoro-p-ethoxycarbonylphenoxy)phthalonitrile, 3,5,6-trifluoro-4-(p-methyl-o-ethoxycarbonylphenoxy) phthalonitrile, 3,6-difluoro-4,5-bis(methoxycarbonylphenoxy)phthalonitrile, 3,6-difluoro-4,5-bis(ethoxycarbonylphenoxy)phthalonitrile, 3,6-difluoro-4,5-bis(butoxycarbonylphenoxy)phthalonitrile, 3,6-difluoro-4,5-bis(o-methyl-p-methoxycarbonylphenoxy)phthalonitrile, 3,6-difluoro-4,5-bis(o-fluoro-p-methoxycarbonylphenoxy) phthalonitrile, 3,6-difluoro-4,5-bis(o-methoxy-p-ethoxycarbonylphenoxy)phthalonitrile, 3,6-difluoro-4,5-bis(tetrafluoro-p-ethoxycarbonylphenoxyphthalonitrile, 3,6-difluoro-4,5-bis(2,5-dichlorophenoxy)phthalonitrile, 3,6-difluoro-4,5-bis(methoxycarbonyl phenylthio)phthalonitrile, 3,6-difluoro-4,5-bis(ethoxycarbonyl phenylthio)phthalonitrile, 3,6-difluoro-4,5-bis(butoxycarbonyl phenylthio)phthalonitrile, 3,6-difluoro-4,5-bis(o-methyl-p-methoxycarbophenylthio)phthalonitrile, 3,6-difluoro-4,5-bis(o-fluoro-p-methoxycarbonylphenylthio)phthalonitrile, 3,6-difluoro-4,5-bis(o-methoxy-p-ethoxycarbonylphenylthio) phthalonitrile, 3,5,6-trifluoro-4-anilinophthlonitrile, 3,5,6-trifluoro-4-toluidinophthalonitrile, 3,5,6-trifluoro-4-xylidinophthalonitrile, 3,5,6-trifluoro-4-methoxyanilinophthalonitrile, 3,5,6-trifluoro-4-fluoroanilinophthalonitrile, 3,5,6-trifluoro-4-methylaminophthanonitrile, 3,5,6-trifluoro-4-ethylaminophthalonitrile, 3,5,6-trifluoro-4-butylaminophthalonitrile, 3,5,6-trifluoro-4-octylaminophthalonitrile, 3,6-difluoro-4,5-bisanilinophthalonitrile, 3,6-difluoro-4,5-bistoluidinopthalonitrile, 3,6-difluoro-4,5-bis(methoxyanilino)phthalonitrile, 3,6-difluoro-4,5-bis(ethoxycarbonylanilino)phthalonitrile, 3,5,6-trifluoro-4-dimethylaminoethoxyphthalonitrile, 3,5,6-trifluoro-4-diethylaminoethoxyphthalonitrile, 3,5,6-trifluoro-4-diethylaminoethylthiophthalonitrile, and 3,5,6-trifluoro-4-diethylaminobutylthio phthalonitrile may be particularly preferably used.

The phthalonitrile compounds of the formulae (1)-(4) according to this invention have been invariably known to the art and can be produced by various methods. The tetrafluorophthalonitrile, for example, can be easily obtained by subjecting tetrachlorophthalonitrile obtained by the reaction of chlorination of phthalonitrile to the halogen exchange reaction with a fluorinating agent. The phthalonitrile compound having the substituents (a)-(g) can be obtained, for example, by the nucleophilic substitution of tetraphthalonitrile with a compound having a hydrogen atom or an alkali metal atom attached to the individual substituent thereof

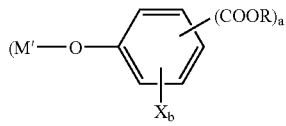

[wherein M' stands for a hydrogen atom or an alkali metal atom] for example, in the case of the substituent (a)). In this case, the phthalonitrile compounds of the formula (1)-(4), which may be identical or not identical, may be properly selected, depending on the structure of the phthalocyanine compound to be produced.

The halogen-containing phthalocyanine compound which can be produced as described above and used particularly preferably for a heat ray-absorbing dye have a structure represented by the following formula:

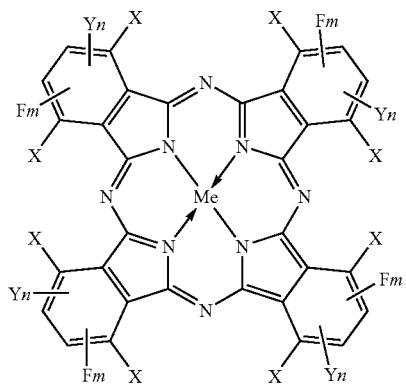

In this formula, F stands for a fluorine atom, Me stands for two hydrogen atoms or a metal atom or a metal compound and corresponds to the symbol "M" in the foregoing formula (5), and Y stands for a substituent selected among the substituents (a)-(g).

The halogen-containing phthalocyanine compound wherein Me is a hydrogen atom can be obtained by subjecting the halogen-containing pthalonitrile compound as a starting material singly to the cyclization. Incidentally, the kinds and positions of the substituents of the halogen-containing phthalocyanine compound of the above formula can be decided depending on the kinds and positions of the substituents of the haloogen-containing phthalonitrile compound of the formulae (1)-(4) to be used.

As preferred examples of the halogen-containing phthalocyanine compound (provided that M in the formula (5) stands for a nonmetal) which can be obtained by the method of this invention, the following compounds may be cited. Incidentally, the compounds according to this invention are not limited thereto. It goes without saying that when the phthalocyanine compounds cited below as examples are in the form of proper metals, metal oxides, or metal halogenides instead of nonmetals, they are included by this invention. In the following compounds, the 3, 6 positions are replaced by the a positions of the phthalocyanine ring (the positions of substitution of $Z_1$, $Z_4$, $Z_5$, $Z_8$, $Z_9$, $Z_{12}$, $Z_{13}$, and $Z_{16}$) and the 4, 5 positions are replaced by the β positions of the phthalocyanine ring (the positions of substitution of $Z_2$, $Z_3$, $Z_6$, $Z_7$, $Z_{10}$, $Z_{11}$, $Z_{14}$, and $Z_{15}$).

Thus, hexadecafluorophthalocyanine, 3,5,6-dodecafluoro-4-tetrakis(methoxycarbonylplhenoxy)phthalocyanine, 3,5,6-dodecafluoro-4-tetrakis(ethoxycarbonylphenoxy)phthalocyanine, 3,5,6-dodecafluoro-4-tetrakis(butoxycarbonylphenoxy)phthalocyanine, 3,5,6-dodecafluoro-4-tetrakis(o-methyl-p-methoxycarbonylphenoxy)phthalycianine, 3,5,6-dodecafluoro-4-tetrakis(o-fluoro-p-methoxycarbonylphenoxy)phthalocyanine, 3,5,6-dodecafluoro-4-tetrakis(o-methoxy-p-ethoxycarbonylphenoxy)phthalocyanine, 3,5,6-dodecafluoro-4-tetrakis(tetrafluoro-p-ethoxycarbonylphenoxy)phthalocyanine, 3,5,6-dodecafluoro-4-tetrakis(p-methyl-o-ethoxycarbonylphenoxy)phthalocyanine, 3,5,6-dodecafluoro-4-tetrakis(methoxycarbonylphenoxy)phthalocyaine, 3,5,6-dodecafluoro-4-tetrakis(ethoxycarbonylphenoxy)phthalocyanine, 3,6-octafluoro-4,5-octakis(methoxycarbonylphenoxy)phthalocyanine, 3,6-octafluoro-4,5-octakis(ethoxycarbonylphenoxy)phthalocyanine, 3,6-octafluoro-4,5-octakis(butoxycarbonylphenoxy)phthalocyanine, 3,6-octafluoro-4,5-octakis(o-methyl-p-methoxycarbonylphenoxy)phthalocyanine, 3,6-octafluoro-4,5-octakis(o-fluoro-p-methoxycarbonylphenoxy)phthalocyanine, 3,6-octafluoro-4,5-octakis(o-methoxy-p-ethoxycarbonylphenoxy)phthalocyanine, 3,6-octafluoro-4,5-octakis(2,5-dichlorophenoxy)phthalocyanine, 3,6-octafluoro-4,5-octakis(methoxycarbonyl phenylthio)phthalocyanine, 3,6-octafluoro-4,5-octakis(ethoxycarbonylphenylthio)phthalocyanine, 3,6-octafluoro-4,5-octakis(butoxycarbonyphenylthio)phthalocyanine, 3,6-octafluoro-4,5-octakis(o-methyl-p-methoxycarbonylphenylthio)phthalocyaine, 3,6-octafluoro-4,5-octakis(o-fluoro-p-methoxycarbonylphenylthio)phthalocyaine, 3,6-octafluoro-4,5-octakis(o-methoxy-p-ethoxycarbonylphenylthio)phthalocyaine, 3,5,6-dodecafluoro-4-tetrakis(anilino)phthalocyanine, 3,5,6-dodecafluoro-4-tetrakis(toluidino)phthalocyanine, 3,5,6-dodecafluoro-4-tetrakis(xyloidino)phthalocyanine, 3,5,6-dodecafluoro-4-tetrakis(methoxyanilino)phthalocyanine, 3,5,6-dodecafluoro-4-tetrakis(fluoroanilino)phthalocyanine, 3,5,6-dodecafluoro-4-tetrakis(methylamino)phthalocyanine, 3,5,6-dodecafluoro-4-tetrakis(ethylamino)phthalocyanine, 3,5,6-dodecafluoro-4-tetrakis-(butylamino)phthalocyanine, 3,5,6-dodecafluoro-4-tetrakis(octylamino)phthalocyanine, 3,6-octafluoro-4,5-octakis(anilino)phthalocyanine, 3,6-octafluoro-4,5-octakis(toluidino)phthalocyanine, 3,6-octafluoro-4,5-octakis(methoxyanilino)phthalocyanine, 3,6-octafluoro-4,5-octakis(ethoxycarbonylanilino)phthalocyanine, 3,5,6-dodecafluoro-4-tetrakis(dimethylaminoethoxy)phthalocyanine, 3,5,6-dodecafluoro-4-tetrakis(diethylaminoethoxy)phthalocyanine, 3,5,6-dodecafluoro-4-tetrakis(diethylaminoethylthio)phthalocyanine, and 3,5,6-dodecafluoro-4-tetrakis(diethylaminobutylthio)phthalocyanine may be cited.

Among other phthalocyanine compounds cited above, hexafluorodecaphthalocyanine, 3,6-octafluoro-4,5-octakis(anilino)phthalocyanine, 3,6-octafluoro-4,5-octakis(methoxycarbonylphenoxy)phthalocyanine, and 3,6-octafluoro-4,5-octakis(2,5-dichlorophenoxy)phthalocyanine may be preferably used. These halogen-containing phthalocyanine compounds can be obtained by using the suitable halogen-containing phthalonitrile compounds as the starting material.

Alternatively, when the halogen-containing phthalocyanine compound produced by the method of this invention is used as a heat ray-shielding material, a plasma display filter, a non-contact fixing toner as for flash fixing, or a near infrared-absorbing agent for heat insultant and storage fibers, for example, it is preferable to use as the raw material such a phthalonitrile compound as produces a phthalocyanine compound (claims 9 and 10) of the formula (5) wherein one to seven substituents at the α-position are are halogen atoms and more preferably one to four substituents at the a-position substituents are halogen atoms and remaining four substituents are $OR^3$. Still more preferably, a phthalocyanine compound whose substituents at the β-position are $SR^2$ or halogen atoms are advantageously used. The phthalocyanine compounds of this sort are characterized by excelling in the capacity for selectively absorbing near infrared ray. They further excel in compatibility with a resin and excel in such characteristic properties as heat-resisttance, light-fastness, and weatherability.

As typical examples of the phthalonitrile compound which can be suitably used as the raw material for the production of these phthalocyanine compounds, 4,5-bis(phenylthio)-3-fluoro-6-anilinophthalonitrile, 4,5-bis(phenylthio)-3-fluoro-6-anisidinophthalonitrile, 4,5-bis(phenylthio)-3-fluoro-6-benzylaminophthalonitrile, 4,5-bis(phenylthio)-3-fluoro-6-butylaminophthalonitrile, 4,5-bis(phenylthio)-3-fluoro-6-ethoxyethanolaminophthalonitrile, 4,5-bis(2-chloro phenylthio)-3-fluoro-6-anilinophthalonitrile, 4,5-bis(2-chloro phenylthio)-3-fluoro-6-benzylaminophthalonitrile, 4,5-bis(4-methoxy phenylthio)-3-fluoro-6-anilinophthalonitrile, 4,5-bis(4-methoxy phenylthio)-3-fluoro-6-benzylaminophthalonitrile, 4,5-bis(4-methoxy phenylthio)-3-fluoro-6-butylaminophthalonitrile, 4,5-bis(2,5-dichloro phenylthio)-3-fluoro-6-anilinophthalonitrile, 4,5-bis(2,5-dichloro phenylthio)-3-fluoro-6-benzylaminophthalonitrile, 4,5-bis(2,5-dichloro phenylthio)-3-fluoro-6-butylaminophthalonitrile, 4,5-bis-(phenylthio)-3-fluoro-6-phenoxyphthalonitrile, 4,5-bis-(phenylthio)-3-fluoro-6-(dimethylphenoxy)phthalonitrile, 4,5-bis(phenylthio)-3-fluoro-6-(dichlorophenoxy)phthalonitrile, 4,5-bis(butylthio)-3-fluoro-6-anilinophthalonitrile, 4,5-bis(butylthio)-3-fluoro-6-(phenoxy)phthalonitrile, 4,5-bis(butylthio)-3-fluoro-6-(hexyloxy)phthalonitrile, 4,5-bis(phenylthio)-3-chloro-6-anilinophthalonitrile, 4,5-bis(phenylthio)-3-chloro-6-anisidinophthalonitrile, 4,5-bis(phenylthio)-3-chloro-6-benzylaminophthalonitrile, 4,5-bis(phenylthio)-3-chloro-6-butylaminophthalonitrile, 4,5-bis(phenylthio)-3-chloro-6-ethoxyethanolaminophthalonitrile, 4,5-bis(2-chloro phenylthio)-3-chloro-6-anilinophthalonitrile, 4,5-bis(2-chloro phenylthio)-3-chloro-6-benzylaminophthalonitrile, 4,5-bis(2-chloro phenylthio)-3-chloro-6-butylaminophthalonitrile, 4,5-bis(2-chloro phenylthio)-3-chloro-6-ethoxyethanolaminophthalonitrile, 4,5-bis(4-methoxy phenylthio)-3-chloro-6-anilinophthalonitrile, 4,5-bis(4-methoxy phenylthio)-3-chloro-6-benzylaminophthalonitrile, 4,5-bis(4-methoxy phenylthio)-3-chloro-6-butylaminophthalonitrile, 4,5-bis(2,5-dichloro phenylthio)-3-chloro-6-anilinophthalonitrile, 4,5-bis(2,5-dichloro phenylthio)-3-chloro-6-benzylaminophthalonitrile, 4,5-bis(2,5-dichloro phenylthio)-3-chloro-6-butylaminophthalonitrile, 4,5-bis(phenylthio)-3-chloro-6-phenoxyphthalonitrile, 4,5-bis(phenylthio)-3-chloro-6-(dimethylphenoxy)phthalonitrile, 4,5-bis(phenylthio)-3-chloro-6-(dichlorophenoxy)phthalonitrile, 4,5-bis(2-chloro phenylthio)-3-chloro-6-phenoxyphthalonitrile, 4,5-bis(2-chloro phenylthio)-3-chloro-6-(dimethylphenoxy)phthalonitrile, 4,5-bis(2-chloro phenylthio)-3-chloro-6-(dichlorophenoxy)phthalonitrile, 4,5-bis(4-methoxy phenylthio)-3-chloro-6-phenoxyphthalonitrile, 4,5-bis(4-phenylthio)-3-chloro-6-(dimethylphenoxy)phthalonitrile, 4,5-bis(4-phenylthio)-3-chloro-6-(dichlorophenoxy)phthalonitrile, 4,5-bis(butylthio)-3-chloro-6-anilinophthalonitrile, 4,5-bis(butylthio)-3-chloro-6-(phenoxy)phthalonitrile, 4,5-bis(butylthio)-3-chloro-6-(hexyloxy)phthalonitrile, 3,4-difluoro-5-phenylthio-6-anilinophthalonitrile, 3,4-difluoro-5-(2-chloro phenylthio)-6-anilinophthalonitrile, 3,4-difluoro-5-(2-chloro phenylthio)-6-benzylaminophthalonitrile, 3-fluoro-4-chloro-5-phenylthio-6-anilinophthalonitrile, 3,4-difluoro-5-phenylthio-6-phenoxphthalonitrile, 3,4-difluoro-5-(4-methoxy phenylthio)-6-anilinophthalonitrile, and 3,4-difluoro-5-(4-methoxy phenylthio)-6-phenoxyphthalonitrile may be cited.

As preferred examples of the phthalocyanine compound (wherein in the formula (5), M is a nonmetal), the following compounds may be cited. Incidentally, the compounds according to this invention are not limited thereto. It goes without saying that when the phthalocyanine compounds cited below as examples are in the form of proper metals, metal oxides, or metal halogenides instead of nonmetals, they are included by this invention. In the following compounds, the 3, 6 positions are replaced by the α positions of the phthalocyanine ring (the positions of substitution of $Z_1$, $Z_4$, $Z_5$, $Z_8$, $Z_9$, $Z_{12}$, $Z_{13}$, and $Z_{16}$) and the 4,5 positions are replaced by the β positions of the phthalocyanine ring (the positions of substitution of $Z_2$, $Z_3$, $Z_6$, $Z_7$, $Z_{10}$, $Z_{11}$, $Z_{14}$, and $Z_{15}$). Thus, 4,5-octakis(phenoxy)-3,6-{tetrakis(phenoxy)-tris(anilino)-fluoro}phthalocyanine, 4,5-octakis(2,6-dichlorophenoxy)-3,6-{tetrakis(2,6-dimethylphenoxy)-tris(DL-1-phenylethylamino)-fluoro}phthalocyanine, 4,5-octakis(2,6-dichlorophenoxy)-3,6-{tetrakis(2,6-dimethylphenoxy)-tirs(benzylamino)-fluoro}phthalocyanine, 4,5-octakis(2,6-dichlorophenoxy)-3,6-{tetrakis(2,6-dibromo-4-methylphenoxy)-tris(DL-1-phenylethylamino)-fluoro}phthalocyanine, 4,5-octakis(2,5-dichlorophenoxy)-3,6-(tetrakis(2,6-dimethylphenoxy)-tris(DL-1-phenylethylamino)-fluoro}phthalocyanine, 4,5-octakis(2,5-dichloroplhenoxy)-3,6-{tetrakis(2,6-dimethylphenoxy)-tris(benzylamino)-fluoro}phthalocyanine, 4,5-octakis(2,5-dichlorophenoxy)-3,6-{tetrakis(2,6-dibromo-4-methylphenoxy)-tris(DL-1-phenylethylamino)-fluoro}phthalocyanine, 4,5-octakis(2,5-dichlorophenoxy)-3,6-{tetrakis(2,6-dibromo-4-methylphenoxy)-bis(DL-1-phenylethylamino)-difluoro}phthalocyanine, 4,5-octakis(4-cyanophenoxy)-3,6-{tetrakis(2,6-dimethylphenoxy)-tris(DL-1-phenylethylamino)-fluoro}phthalocyanine, 4,5-octakis(4-cyanophenoxy)-3,6-{tetrakis(2,6-dimethylphenoxy)-tris-(benzylamino)-fluoro}phthalocyanine, 4,5-octakis(4-cyanophenoxy)-3,6-{tetrakis(2,6-dibromo-4-methylphenoxy)-tris(DL-1-phenylethylamino)-fluoro}phthalocyanine, 4,5-{tetrakis(butoxy)-tetrakis-(2,6-dimethylphenoxy)}-3,6-{tetrakis(2,6-dimethylphenoxy)-tris(benzylamino)-fluoro}phthalocyanine, 4,5-octakis(phenylthio)-3,6-{tetrakis(2,6-dimethylphenoxy)-tris(benzylamino)-fluoro}phthalocyanine, 4,5-octakis(phenylthio)-3,6-{tetrakis(2,6-dimethylphenoxy)-tris(anilino)-fluoro}phthalocyanine, 4,5-octakis(butylthio)-3,6-{tetrakis(2,6-dimethylphenoxy)-tris(benzylamino)-fluoro}phthalocyanine, 4,5-{tetrakis(butoxy)-tetrakis(phenylthio)}-3,6-(tetrakis-(2,6-dimethylphenoxy)-tris(DL-1-phenylethylamino)-fluoro}phthalocyanine, 4,5-octakis(phenoxy)-3,6-{tetrakis(phenoxy)-tris(benzylamino)- chloro}phthalocyanine, 4,5-octakis(phenylthio)-3,6-(heptakisphenylethylamino-fluoro)phthalocyanine, 4,5-octakis(phenylthio)-3,6-(pentakisphenylethylamino-trifluoro)phthalocyanine, 4,5-octakis(phenylthio)-3,6-(heptakis(DL-1-phenylethylamino)-fluoro}phthalocyanine, 4,5-octakis(phenylthio)-3,6-(pentakis(DL-1-phenylethylamino)-trifluoro)phthalocyanine, 4,5-octakis(phenylthio)-3,6-(heptakisbenzhydrylamino-fluoro)phthalocyanine, 4,5-octakis(phenylthio)-3,6-(pentakisbenzhydrylamino-trifluoro)phthalocyanine, 4,5-octakis(p-cyanophenoxy)-3,6-(heptakisphenylethylamino-fluoro)phthalocyanine, 4,5-octakis(p-cyanophenoxy)-3,6-(pentakisphenylethylamino-trifluoro)phthalocyanine, 4,5-octakis(p-cyanophenoxy)-3,6-{heptakis(DL-1-phenylethylamino)-fluoro}phthalocyanine, 4,5-octakis(p-cyanophenoxy)-3,6-{pentakis(DL-1-phenylethylamino)-trifluoro}phthalocyanine, 4,5-octakis(p-cyanophenoxy)-3,6-(heptakisbenzhydrylamino-fluoro)phthalocyanine, 4,5-octakis(p-cyanophenoxy)-3,6-(pentakisbenzhydrylamino-trifluoro)phthalocyanine, 4,5-octakis(phenoxy)-3,6-(pentakisanilino-trifluoro)phthalocyanine, 4,5-octakis(phenoxy)-3,6-(tetrakisanilino-tetrafluoro)phthalocyanine, 4,5-octakis(phenoxy)-3,6-(trisanilino-pentafluoro)phthalocyanine, 4,5-octakis(phenoxy)-3,6-(pentakisanisidino-trifluoro)phthalocyanine, 4,5-octakis(phenoxy)-3,6-(trisanisidino-pentafluoro)phthalocyanine, 4,5-octakis(phenoxy)-3,6-(heptakisbenzylamino-monofluorphthalocyanine, 4,5-octakis(phenoxy)-3,6-(hexakisbenzylamino-difluoro)phthalocyanine, 4,5-octakis(phenoxy)-3,6-(hexakisbenzylamino-difluoro)phthalocyanine, 4,5-octakis(phenoxy)-3,6-(pentakisbenzylamino-trifluoro)phthalocyanine, 4,5-octakis(phenoxy)-3,6-(tetrakisbenzylamino-tetrafluoro)phthalocyanine, 4,5-octakis(phenoxy)-3,6-(heptakisbutylamino-monofluoro)phthalocyanine, 4,5-octakis(phenoxy)-3,6-(pentakisbutylamino-trifluoro)phthalocyanine, 4,5-octakis-(phenoxy)-3,6-(hexakisethoxyethanolamino-difluoro)phthalocyanine, 4,5-octakis(phenoxy)-3,6-(pentakisbutylcarbonylphenylamino-trifluoro)phthalocyanine, 4,5-octakis(butoxy)-3,6-(pentakisanilino-trifluoro)phthalocyanine, 4,5-octakis(butoxy)-3,6-(trisanilino-pentafluoro)phthalocyanine, 4,5-octakis(butoxy)-3,6-(heptakisbenzylamino-monofluoro)phthalocyanine, 4,5-octakis(butoxy)-3,6-(pentakisbenzylamino-trifluoro)phthalocyanine, 4,5-(trisbutoxy-pentafluoro)-3,6-(heptakisbutylamino-monofluoro)phthalocyanine, 4,5-(tetrakisbutoxy-tetrafluoro)-3,6-(pentakisbutylamino-trifluoro)phthalocyanine, 4,5-(tetrakisphenoxy-tetralfuoro)-3,6-(hexakisbenzylamino-difluoro)phthalocyanine, 4,5-octakis(p-cyanophenoxy)-3,6-(heptakisphenylethylamino-fluoro)phthalocyanine, 4,5-octakis(p-cyanophenoxy)-3,6-(pentakisphenylethylamino-trifluoro)phthalocyanine, 4,5-octakis(p-cynophenoxy)-3,6-{heptakis(DL-1-phenylethylamino)-fluoro}phthalocyanine, 4,5-octakis-p-cyalophenoxy)-3,6-{pentakis(DL-1-phenylethylamino)-trifluoro}phthalocyanine, 4,5-octakis(p-cyalophenoxy)-3,6-(heptakisbenzhydrylamino-fluoro)phthalocyanine, 4,5-octakis(p-cyanophenoxy)-3,6-(pentakisbenzhydrylamino-trifluoro)phthalocyanine, 4,5-octakis(2,5-dichlorophenoxy)-3,6-{pentakis(DL-1-phenylethylamino)-trifluoro}phthalocyanine, and 4,5-octakis(2,5-dichlorophenoxy)-3,6-{hexakis(DL-1-phenylethylamino)-difluoro}phthalocyanine may be cited.

According to this invention, by causing the phthalonitrile compounds represented by the formulae (1)-(4) to react in the presence of an organic compound having a hydroxyl group and/or a carboxyl group either along or in combination with a metal compound while continuing the introduction of an inert gas during the course of the reaction, the corresponding halogen-containing phthalocyanine compound can be produced in a high yield. The present inventors' review, however, has revealed that, depending on the kind of the substituent of $NHR^1$, $SR^2$, or $OR^3$ or the number of such substituents, the cyclization, if managed to proceed at all, possibly fails to enable the substituent of $NHR^1$, $SR^2$, or $OR^3$ to be substituted at a favorable velocity and eventually prevents a target halogen-containing phthalocyanine compound from being obtained as expected.

The phthalocyanine compound having not less than 12 substituents of $NHR^1$, $SR^2$, or $OR^3$ may be obtained by the method of production as mentioned above. It has been found, however, that by subjecting the halogen-containing phthalocyanine compound to be produced by the method as mentioned above further to the substitution reaction with at least one compound selected from the group consisting of amino compounds represented by the formula: $M'—NHR^4$, sulfur-containing compounds represented by the formula: $M'—SR^5$, and alcohol compounds represented by the formula: $M'—OR^6$ (wherein M' stands for a hydrogen atom or an alkali metal atom, and $R^4$, $R^5$, and $R^6$ independently stand for a phenyl group which may be substituted, an aralkyl group which may be substituted, or an alkyl group of 1-20 carbon atoms which may be substituted), the desired number of subsitutents, $NHR^1$, $SR^2$, or $OR^3$, can be introduced efficiently into the phthalocyanine compound, to produce in a high yield a halogen-containing phthalocyanine compound manifesting target functions such as, for example, a capacity for selectively absorbing light of near infrared wavelength, compatibility with a resin, and a high transmission in the visible region (claim 2). Incidentally, the halogen-containing phthalocyanine compound in this case is preferably a compound of the formula (5) wherein at least two of the groups $Z_1$-$Z_{12}$ are halogen atoms, particularly fluorine atoms. Consequently, the phthalonitrile compounds of the formulae (1)-(4) which can be used as the raw material for the production thereof are required to be so selected as to suit the production of the phthalocyanine compound.

To be specific, the production is effected by a method which comprises subjecting a phthalonitrile compound (1) represented by the following formula (1):

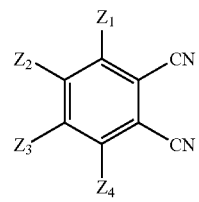

(1)

a phthalonitrile compound (2) represented by the following formula (2):

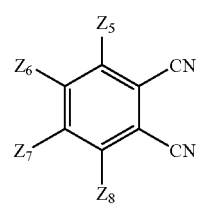

(2)

a phthalonitrile compound (3) represented by the following formula (3):

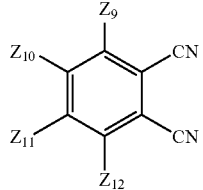
(3)

and a phthalonitrile compound (4) represented by the following formula (4):

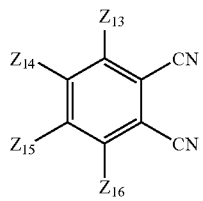
(4)

wherein in the formulae (1)-(4), $Z_1$-$Z_{16}$ independently stand for a hydrogen atom, $NHR^1$, $SR^2$, $OR^3$, or a halogen atom, provided that at least two of the $Z_1$-$Z_{16}$ stands for a halogen atom; $R^1$, $R^2$, and $R^3$ independently stand for a phenyl group which may be substituted, an aralkyl group which may be substituted, or an alky of 1-20 carbon atoms which may be substituted, either singly or in combination with a metal compound to the cyclization in an organic compound having a hydroxyl group and/or a carboxyl group in an amount of 0.01-10 mass parts based on 1 mass part of the phthalonitrile compounds while introducing an inert gas, to produce a a halogen-containing phthalocyaline compound (a) represented by the following formula (5):

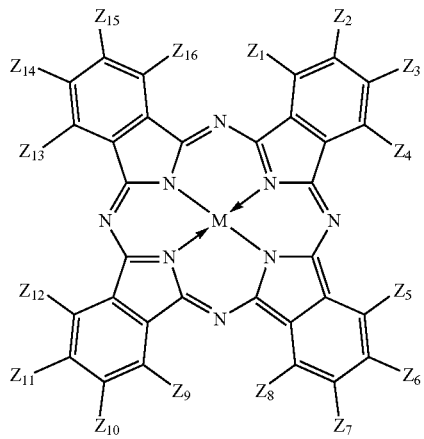
(5)

wherein $Z_1$-$Z_{16}$ independently stand for a hydrogen atom, $NHR^1$, $SR^2$, $OR^3$, or a halogen atom, provided that at least two of the $Z$-$Z_{16}$ stands for a halogen atom; $R^1$, $R^2$, and $R^3$ independently stand for a phenyl group which may be substituted, an aralkyl group which may be substituted, or an alkyl group of 1-20 carbon atoms which may be substituted; and M stands for a nonmetal, a metal, a metal oxide, or a metal halogenide, and then further subjecting the halogen-containing phthalocyanine compound (a) to the substitution reaction with at least one compound selected from the group consisting of amino compounds represented by the formula (7): M'—$NHR^4$, sulfur-containing compounds represented by the formula (8) M'—$SR^5$, and alcohol compounds represented by the formula (9) M'—$OR^6$ (wherein M' stands for a hydrogen atom or an alkali metal atom, and $R^4$, $R^5$, and $R^6$ independently stand for a phenyl group which may be substituted, an aralkyl group which may be substituted, or an alkyl group of 1-20 carbon atoms which may be substituted), thereby producing a halogen-containing phthalocyanine compound (b) represented by the following formula (5):

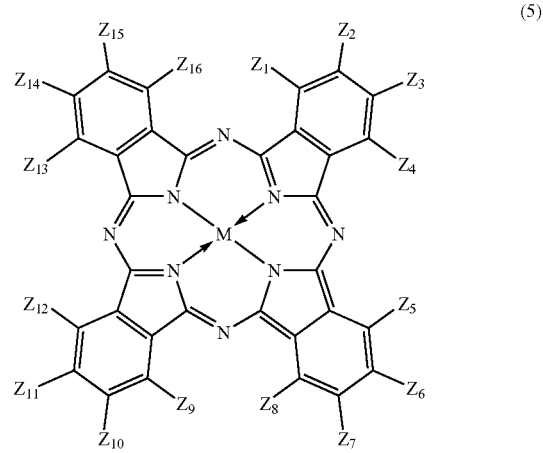
(5)

wherein $Z_1$-$Z_{16}$ independently stand for a hydrogen atom, $NHR^1$, $SR^2$, $OR^3$, or a halogen atom, provided that at least one of the $Z_1$-$Z_{16}$ stands for a halogen atom, and at least one of the $Z_1$-$Z_{16}$ is $NHR^1$, $SR^1$, or $OR^2$; $R^1$, $R^2$, and $R^3$ independently stand for a phenyl group which may be substituted, an aralkyl group which may be substituted, or an alkyl group of 1-20 carbon atoms which may be substituted; and M stands for a nonmetal, a metal, a metal oxide, or a metal halogenide. Since $R^1$, $R^2$, $R^3$, M, and halogen atom in the above formulae have the same definitions as above and will be omitted from the explanation here. The method for the production of the halogen-containing phthalocyanine compound (a) is the same as above except the phthalonitrile compounds of the formula (1)-(4) as the starting material are so selected as to have at least two of the substituents $Z_1$-$Z_{16}$ to be halogen atoms and will be omitted from the explanation here.

Herein, therefore, the substituion of the halogen-containing compound (a) with the amino compound represented by the formula (7): M'—$NHR^4$ (hereinafter referred to as "amino compound (7)"), the sulfur-containing compound represented by the formula (8): M'—$SR^5$ (hereinafter referred to as "sulfur-containing compound (8)"), and the alcohol compound represented by the formula (9): M'—$OR^6$ (hereinafter referred to as "alcohol compound (9)") will be described in detail below.

In the formulae (7)-(9) mentioned above, M' stands for a hydrogen atom or an alkali metal atom. As typical examples of the alkali metal atom, lithium, sodium, and potassium may be cited. Among other atoms cited above, M' is preferably a hydrogen atom or sodium atom. Then, $R^4$, $R^5$, and $R^6$ independently stand for a phenyl group which may be substituted, an aralkyl group which may be substituted, or an alkyl group of 1-20 carbon atoms which may be substituted. Their definitions and typical examples are the same as those of $R^1$, $R^2$, and $R^3$ in the formulae (1)-(4) as mentioned above.

In this invention, the amino compound (7) does not need to be particularly restricted but is only required to be represesnted by M'—$NHR^4$. Specifically, the amino compound (7) represented by the following formula is preferably used.

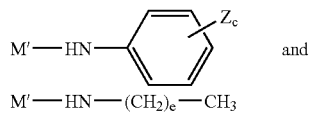

In these formulae, M' has the same definition as in the formulae (7)-(9), Z and c have the same definitions as in the substituent (c) as mentioned above, and e has the same definition as in the substituent (f) as mentioned above. As typical examples of the amino compound (7), benzyl amine, aniline, o-, m-, and p-toluidine, 2,4-, and 2,6-xylidine, o-, m-, and p-methoxyaniline, o-, m-, and p-fluoroaniline, tetrafluoroaniline, and p-ethoxycarbonyl aniline; methyl amine, ethyl amine, and butyl amine may be cited. These amino compounds (7) may be used either singly or in the form of a mixture of two or more members.

The sulfur-containing compound (8) does not need to be particularly restricted but is only required to be represented by the formula: M'—$SR^5$. Specifically, the compounds represented by the following formulae are preferably used.

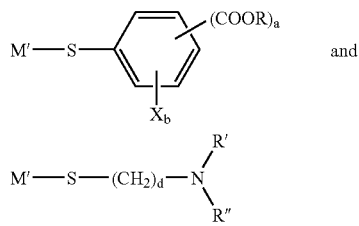

In these formulae, M' has the same definition as in the formulae (7)-(9) as mentioned above, R, X, a, and b have the same definitions as in the substituent (b) as mentioned above, and R', R", and d have the same definitions as in the substituent (e) as mentioned above. As typical examples of the sulfur-containing compound (8), benzene thiol, o-, m-, and p-methoxycarbonyl benzene thiol, o-, m-, and p-ethoxycarbonyl benzene thiol, o-, m-, and p-butoxycarbonyl benzene thiol, o-methyl-p-methoxy-carbonyl benzene thiol, o-methoxy-p-methoxycarbonyl benzene thiol, o-fluoro-p-methoxycarbonyl benzene thiol, tetrafluoro-p-ethoxycarbonyl benzene thiol, o-ethoxycarbonyl-p-methyl benzene thiol, o-butoxycarbonyl-p-methyl benzene thiol, o-butoxycaronyl-p-fluorobenzene thiol, p-methyl-m-butoxycarbonyl benzene thiol; dimethylaminoethyl thiol, diethylaminoethyl thiol, dibutylaminobutyl thiol; and the alkali metal salts thereof may be cited. These sulfur-containing compounds (8) may be used either singly or in the form of a mixture of two or more members.

Then, the alcohol compound (9) does not need to be particularly restricted but is only required to be represented by the formula: M'—$OR^6$. Specifically, the compounds represented by the following formulae are preferably used.

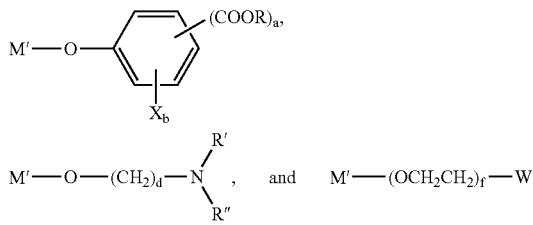

In these formulae, M' has the same definition as in the formulae (7)-(9) as mentioned above, R, X, a, and B have the same definitions as in the substituent (a) as mentioned above, R', R", and d have the same definitions as in the substituent as (d) mentioned above, and W and f have the same definitions as in the substituent (g) as mentioned above. As typical examples of the alcohol compound (9), o-, m-, and p-methoxycarbonyl phenol, o-, m-, and p-ethoxycarbonyl phenol, o-, m-, and p-butoxycarbonyl phenol, o-methyl-p-methoxycarbonyl phenol, o-methoxy-p-ethoxycarbonyl phenol, o-fluoro-p-methoxycarbonyl phenol, tetrafluoro-p-ethoxycarbonyl phenol, o-ethpoxycarboyl-p-methyl phenol, o-butoxycarbonyl-p-methyl phenol, o-butoxycarbonyl-p-fluoro phenol, p-methyl-m-butoxycarbonyl phenol, 2,5-dichlorophenol; dimethylaminoethanol, diethylaminoethanol, diethylaminobutanol; methoxyethanol, 3',6',9'-oxadecnol, 3',6',9',12'-oxatridecanol, acetylethanol, 5'-acetyl-3'-oxapentanol, 8'-acetyl-3',6'-oxaoctanol; and the alkali metal salts thereof may be cited. These alcohol compounds (9) may be used either singly or in the form of a mixture of two or more members.

In this invention, the amino compound (7), the sulfur-containing compound (8), and the alcohol compound (9) may be used either singly or in the form of a combination of two or more members.

The amounts of the amino compound (7), the sulfur-containing compound (8), and the alcohol compound (9) may be properly selected so as to suit the structure of the phthalocyanine compound (b) aimed at. The total amount of these compounds to be used does not need to be particularly restricted but is only required to allow the reaction thereof to proceed and to produce the phthalonitrile compound aimed at. It is generally in the range of 1-50 mols and preferably in the range of 2-40 mols, based on 1 mol of the phthalocyanine compound (a).

The conditions for the substitution of the phthalocyanine compound (a) with the amino compound (7), the sulfur-containing compound (8), and the alcohol compound (9) according to this invention do not need to be particularly restricted but are only required to be properly selected in the optimum range so as to allow the introduction of chosen substituents into the desired positions of the substituents $Z_1$-$Z_{16}$ of the phthalocyanine compound (b) of the formula (5). The substitution, for example, can be carried out by mixing the the phthalocyanine compound (a) with the amino compound (7), the sulfur-containing compound (8), and the alcohol compound (9) optionally in the presence of an inert solution having no reactivity with these compounds for the use in the reaction, and heating the resultant mixture to a prescribed temperature. Preferably, it is carried out by heating the reactants to the prescribed temperature in the amino compound (7), the sulfur-containing compound (8), and the alcohol compound (9). As the inert liquid, in the reaction of the phthalocyanine compound (b) and the amino compound of the formula (7), for example, nitrites such as benzonitrile and acetonitrile and such amides as N-methylpyrrolidone and dimethyl formamide may be used either singly or in the form of a mixture of two or more members. Then, the amino compound (7), the sulfur-containing compound (8), and the alcohol compound (8) may be respectively used also as a solvent in the substitution.

The conditions for the substituion reaction contemplated by this invention are only required to be properly selected in the optimum range so as to effect the designed introduction of the chosen substituents into the positions of the substituents of $Z_1$-$Z_{16}$ of the phthalocyanine compound (b) of the formula (5). The following conditions, for example, can be preferably used. Specifically, the amino compound (7)/sulfur-containing compound (8)/alcohol compound (9) may be charged in the amounts as mentioned above. Incidentally, in this process, the phthalocyanine compound (a) may be provisionally separated and purified and then allowed to react with the amino compound (7)/sulfur-containing compound (8)/alcohol compound (9) to introduce the chosen substituents into the phthalocyanine skeleton and produce the phthalocyanine compound (b), or the phthalocyanine compound (a) may not be separated or purified but allowed to react in the same reaction vessel with the amino coupound (7)/sulfur-containing compound (8)/alcohol compound (9) so as to induce the expected introduction of chosen substituents into the phthalocyanine skeleton and produce the phthalocyanine compound (b). Preferably from the commercial point of view, the produced phthalocyanine compound may not be separated and purified but may be induced in the same reaction vessel to effect the introduction of the substituents into the phthalocyanine skeleton and consequently produce the target phthalocyanine compound (b). Then, the temperature and time of the subsitution according to this invention do not need to be particularly restricted but are only required to allow the substituion to proceed satisfactorily. The reaction temperature is preferably in the range of 40-200° C. and more preferably in the range of 50-190° C. and the reaction time is preferably in the range of 1-30 hours and more preferably in the range of 2-20 hours. After the reaction, the phthalocyanine compound aimed at by this invention can be obtained in high yield with a high purity by following the well-known method of synthesis resorting to the substitution of phthalocyanine compound, namely by filtering off inorganic components and expelling the amino compound by distillation (purification) without entailing a complicated operation.

Since the substitution according to this invention uses as the raw material the phthalonitrile compound having a halogen atom like fluorine atom, it has a possibility of generating a small amount of a hydrogen halogenide such as hydrogen fluoride during the course of the reaction and corroding the reaction vessel made of glass or stainless steel. With the object of trapping the generated hydrogen halogenide and preventing it from corroding the reaction vessel, therefore, the reaction may be carried out in the presence of an agent for trapping hydrogen fluoride. As typical examples of the trapping agent used therefor, alkaline earth metal compounds such as calcium carbonate, calcium hydroxide, calciumoxide, calciumsilicae, and calciumacetate, and alkyl amines such as tri-n-butylamine, tri-n-octylamine, N,N-dimethyl aniline, and N,N-diethyl aniline may be cited. These agents may be used either singly or in the form of a mixture of two or more members under such conditions as that the combined use does not affect each other. The amount of the agent to be used in this case does not need to be particularly restricted but is only required to trap the hydrogen halogenide satisfactorily. This amount is preferably in the range of 1-20 mols and more preferably in the range of 2-10 mols, based on 1 mol of the phthalocyanine compound (a).

In the cyclization according to this invention, the metal compound used as the central metal source possibly contains water as the so-called crystal water. If the water is present in the metal compound, the cyclization would be possibly observed to entail emission of water. When calcium carbonate, for example, is used as the trapping agent for hydrogen fluoride for the purpose of preventing the hydrogen fluoride generated during the course of reaction from corroding the reaction vessel, the reaction inevitably induces the emission of water in accordance with the following reaction formula.

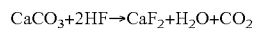

$$CaCO_3 + 2HF \rightarrow CaF_2 + H_2O + CO_2$$

When the water is generated during the reaction, reaction vessel is preferably fitted with a proper water separating tube in order to separate the water generated in the reaction vessel, to expel it out of the reaction vessel, and to enable the cyclization to proceed smoothly from the viewpoint of preventing the reaction vessel from corrosion and ensuring the stability of the temperature of the reaction solution in the management of the commercial operation of the plant and for the sake of continuing the production safely and stably.

EXAMPLES

Now, this invention will be described more specifically below with reference to working examples.

Example 1

Synthesis of hexadecafluorovanadylphthalocyanine

Into a separable flask of glass provided with a stirrer, a thermometer, a water separation tube, and a cooling tube and having an inner volume of 300 ml, a nitrogen gas was introduced at a rate of 500 ml/min for 10 minutes to replace the interior of the reaction vessel with the nitrogen gas. Then, the reaction vessel was charged with 30 gr (0.15 mol) of tetrafluorophthalonitrile, 58.6 gr (0.45 mol) of n-octanol, and 6.9 gr (0.0438 mol) of vanadium trichloride (produced by Sinko Kagaku K. K.). Again, a nitrogen gas was introduced at a rate of 500 ml/min for 10 minutes into the reaction vessel to replace the interior thereof with the nitrogen gas. When the oxygen concentration in the reaction vessel was determined with an oxygen concentration meter, it was found to be 1.8 vol %.

Under the condition of continued stirring, the reaction mixture in the reaction vessel was exposed to a current of nitrogen gas at a flow rate of 30 ml/min and heated. The linear speed of the gas at the inlet part (the connecting part between the reaction vessel and the cooling tube) was 0.6 cm/sec and the oxygen concentration in the reaction vessel was measured with an oxygen concentration meter to be found to be 1.8 vol %.

The temperature was elevated to 150° C. over two hours, then the reaction was further continued for three hours, and the reaction vessel was left cooling to normal room temperature. In the meanwhile, the flow of the nitrogen gas was continued. The conversion of tetrafluorophthalonitrile was determined by liquid chromatography, to find to be 99.2%. The slurry resulting from the cyclization was filtered to separate a solid component. The solid component was washed with 300 gr of benzonitrile, then washed with 100 gr of methanol, and dried under a reduced pressure at 150° C. for 12 hours.

The weight of the target product, hexadecafluorovanadyphthalocyanine, as calculated from the weight after drying, was 28.1 gr (yield: 86.4 mol %).

Example 2

When the reaction was performed by following the procedure of Example 1 while using 60 g (0.50 mol) of diethylene glycol monomethyl ether as the solvent for the cyclization in place of n-octanol, the amount of the target product, hexadecafluorovanadylphthalocyanine, was found to be 23.1 gr (yield: 71.1 mol %).

Example 3

When the reaction was performed by following the procedure of Example 1 while using 48.7 gr (0.45 mol) of benzyl alcohol as the solvent for the cyclization, in place of n-octanol, the amount of the target product, hexadecafluorovanadylphthalocyanine, was found found to be 25.5 gr (yield: 78.3 mol %).

Example 4

The reaction was performed by following the procedure of Example 1 while using a mixed solvent of 28.6 gr (0.22 mol) of n-octanol with 30 gr (0.29 mol) of benzonitrile in place of 58.6 gr (0.45 mol) of n-octanol.

The conversion of tetrafluorophthalonitrile was determined by liquid chromatography, to find to be 99.5%. The reaction slurry resulting from the cyclization was filtered to separate a solid component. The solid component was washed with 300 gr of benzonitrile, then washed with 100 gr of methanol and dried under a reduced pressure at 150° C. for 12 hours.

The weight of the target product, hexadecafluorovanadylphthalocyanine, as calculated from the weight after drying, was 29.6 g (yield: 91.0 mol %).

Example 5

The reaction was performed by following the procedure of Example 4 while using 30 g (0.18 mol) of 1-chloronaphthalene in place of 30 gr of benzonitrile. The conversion of tetrafluorophthalonitrile was determined by liquid chromatography, to find to be 99.2%. The reaction solution resulting from the cyclization and 100 gr of benzonitrile added thereto were stirred at room temperature for one hour and the resultant reaction slurry was filtered to separate a solid component. The solid component was washed with 300 gr of benzonitrile, then washed with 100 gr of methanol, and dried under a reduced pressure at 150° C. for 12 hours.

The weight of the target product, hexadecafluorovanadylphthalocyanine, as calculated from the weight after drying, was 28.8 gr (yield: 88.6 mol %).

Example 6

The reaction was performed by following the procedure of Example 4 while using 11.6 gr (0.0438 mol) of vanadyl acetyl acetonate in place of vanadium trichloride. The conversion of tetrafluorophthalonitrile was determined by liquid chromatography, to find to be 98.8%. The reaction slurry resulting from the cyclization was filtered to separate a solid component. The solid component was washed with 300 gr of benzonitrile, then washed with 100 gr of methanol, and dried under a reduced pressure at 150° C. for 12 hours.

The weight of the target product, hexadecafluorovanadylphthalocyanine, as calculated from the weight after drying, was 28.4 gr (yield: 87.5 mol %).

Example 7

Synthesis of octafluorooctakisanilinovanadylphthalocyanine

Into a separable flask of glass provided with a stirrer, a thermometer, a water separation tube, and a cooling tube and having an inner volume of 300 ml, a nitrogen gas was introduced at a rate of 500 ml/min for 10 minutes to replace the interior of the reaction vessel with the nitrogen gas. Then, the reaction vessel was charged with 30 gr (0.15 mol) of tetrafluorophthalonitrile, 58.6 gr (0.45 mol) of n-octanol, 6.9 gr (0.0438 mol) of vanadium trichloride (made by Sinko Kagaku K. K.), and 4.5 gr (0.045 mol) of calcium carbonate. Again, a nitrogen gas was introduced at a rate of 500 ml/min for 10 minutes into the reaction vessel to replace the interior thereof with the nitrogen gas. When the oxygen concentration in the reaction vessel was determined with an oxygen concentration meter, it was found to be 1.6 vol %.

Under the condition of continued stirring, the reaction mixture in the reaction vessel was heated to 150° C over a period of two hours, and the reaction was further continued for three hours. In this while, the flow of the nitrogen gas was continued. When the oxygen concentration in the reaction vessel was determined with an oxygen concentration meter, it was found to be 1.6 vol %. The conversion of tetrafluorophthalonitrile was determined by liquid chromatography, to find to be 99.2%. The reaction slurry resulting from the cyclization, and 112 gr (1.204 mol) of aniline and 15 gr (0.15 mol) of calcium carbonate added thereto were left reacting at 150° C. for two hours, and then heated to 170° C. and left reacting for 9 hours. The reaction solution resulting from the reaction was cooled to room temperature and the cooled reaction solution and 60 gr of acetone were added thereto with stirred. The resultant reaction solution was filtered to separate a solid component. The solid component was washed with 30 gr of acetone. The reaction filtrate was transferred into a separable flask of glass provided with stirrer and a thermometer and having an inner volume of 2 L. The filtrate and 540 gr of isopropyl alcohol added thereto were stirred for about 10 minutes. The stirring was continued for one hour after the completion of the addition. After the completion of the stirring, the reaction slurry was filtered and the cake obtained by the filtration was washed with a mixed solution of isopropyl alcohol and acetone. The cake was filtered and dried under a reduced pressure at 80° C. for 15 hours.

The solid content after the drying was 37.4 gr and the yield, as reduced to the target product, octafluorooctakisanilinovanadylphthalocyanine, was 68.7 mol %.

Referential Example 1

Synthesis of 4,5-bis(2,5-dichlorophenoxy)-3,6-difluorophthalonitrile

Into a separable flask of glass provided with a stirrer, a thermometer, a water separation tube, and a cooling tube and having an inner volume of 300 ml, 242.5 gr of acetone and 19.1 gr (0.0955 mol) of tetrafluorophthalonitrile were placed, to dissolve tetrafluorophthalonitrile in acetone homogeneously. Next, the resultant solution and 134 gr (0.2306 mol) of potassium fluoride were added together and the resultant reaction slurry was retained at −5° C. To this reaction slurry, 34.1 gr (0.2092 mol) of 2,5-dichlorophenol dissolved uniformly in 30.5 gr of acetone was added dropwise over a period of one hour. The reaction proceeding during the dropwise addition was continued with the reaction product cooled from the exterior so as to keep the interior temperature thereof in the range of −5° C. to 0° C. After the dropwise addition was completed, the reaction mixture was retained for additional two hours. After the reaction was completed, the contents of the flask were cooled to 20° C. and filtered to separate the solid component.

The solid component was washed with 10 gr of acetone and the washed solid component and the filtrate were mixed together. The resultant filtrate was evaporated under a reduced pressure to expel acetone by distillation. The weight of the produced dry component was 45.8 gr (crude yield: 98.7 mol). This dry component was found to contain 42.9 gr of the target product, 4,5-bis(2,5-dichlorophenoxy)-3,6-difluorophthalonitrile (yield: 92.4 mol %).

Example 8

Synthesis of octafluorooctakis(2,5-dichlorophenoxy) copperphthalocyanine

Into a separable flask of glass provided with a stirrer, a thermometer, a water separation tube, and a cooling tube and having an inner volume of 300 ml, a nitrogen gas was introduced at a rate of 500 ml/min for 10 minutes to replace the interior of the reaction vessel with the nitrogen gas. Then, the reaction vessel was charged with 34.4 gr of a solid component containing 4,5-bis(2,5-dichlorophenoxy)-3,6-difluorophthalonitrile synthesized in Referential Example 1 [the mol number of 4,5-bis(2,5-dichlorophenoxy)-3,6-difluorophthalonitrile 0.0663 mol], 51.6 gr (0.3962 mol) of n-octanol, 1.72 gr (0.0174 mol) of cuprous chloride, and 6.7 gr (0.067 mol) of calcium carbonate. Again, a nitrogen gas was introduced at a rate of 500 ml/min for 10 minutes into the reaction vessel to replace the interior thereof with the nitrogen gas. When the oxygen concentration in the reaction vessel was determined with an oxygen concentration meter, it was found to be 1.5 vol %.

The reaction mixture in the reaction vessel was heated with stirred to 150° C. for one hour under a current of a nitrogen gas at a flow rate of 30 ml/min, left the reaction for 3 hours, and then cooled to room temperature. The linear speed of the gas at the inlet part (the connecting part between the reaction vessel and the cooling tube) was 0.6 cm/sec and the oxygen concentration in the reaction vessel was measured with an oxygen concentration meter, to find to be 1.5 vol %. The conversion of 4,5-bis(2,5-dichlorophenoxy)-3,6-difluorophthalonitrile was determined by liquid chromatography, to find to be 99.6%. 150 gr of benzonitrile was added to the resultant reaction slurry and the resultant mixture was filtered to separate a solid component. The solid component was washed with 30 gr of benzonitrile. The filtrate was introduced into 1000 ml of acetonitrile with stirred and left standing therein for one hour. The precipitate consequently formed was filtered, washed with 100 ml of acetonitrile, and then dried under a reduced pressure at 100° C. for 8 hours. The weight of the target product, octafluorooctakis(2,5-dichlorophenoxy)copperphthalocyanine, as calculated from the weight after the drying, was found to be 26.3 gr (yield: 79.0 mol).

Example 9

The product, octafluorooctakis(2,5-dichlorophenoxy)copper phthalocyanine, to be produced folloing the cyclization in Example 8, was used in the following reaction in the same reaction vessel as used in Example 8 without any purification thereof, for the purpose of further converting the fluorine of the phthalocyanine compound to the benzylamino group.

The reaction solution resulting from the cyclization was cooled to 90° C. The cooled reaction solution, 25.1 gr (0.23 mol) of benzyl amine and 3.5 gr of calcium carbonate as a corrosion inhibitor added thereto were left reacting at 90° C. for 8 hours. 27.5 gr of benzonitrile was added to the reaction mixture and the resulting mixture was cooled to room temperature, and filtered to separate a solid component.

The target product was precipitated by adding 2200 gr of acetonitrile to the filtrate. The resultant precipitate was separated by filtration, washed with acetonitrile, and then dried under a reduced pressure at 60° C. for 12 hours. The weight of the target product, 4,5-octakis(2,5-dichlorophenoxy)-3,6-(tetrakisbenzylamino-tetrafluoro)copperphthalocyanine, as calculated from the weight after the drying, was found to be 29.3 g (yield: 72.6 mol).

Example 10

The cyclization was performed by following the procedure of Example 8 while using 23 gr (0.177 mol) of n-octanol and 30 gr (0.291 mol) of benzonitrile in place of 51.6 gr of n-octanol. The conversion of 4,5-bis(2,5-dichlorophenoxy)-3,6-difluorophthalonitrile was determined by liquid chromatography, to find to be 99.8%. The reaction product was purified by the same procedure, and dried under a reduced pressure at 100° C. for 8 hours. The weight of the resultant target product, octafluorooctakis(2,5-dichlorophenoxy)copperphthalocyanine, as calculated from the weight after drying, was 28.9 gr (yield: 86.8 mol %).

Referential Example 2

Synthesis of 4-(2-chloro phenylthio)-3,5,6-trifluorophthalonitrile

Into a four-neck flask of glass provided with a stirrer, a thermometer, a water separation tube, and a cooling tube and having an inner volume of 100 ml, 30 gr of 2-butanone, 10 gr (0.05 mol) of tetrafluorophthalonitrile, and 3.63 gr (0.062 mol) of potassium fluoride were placed and the flask was dipped in a water bath. The reaction mixture in the reaction vessel was kept stirred at room temperature and 7.6 g (0.053 mol) of 2-chlorobenzene thiol were added thereto over about 20 minutes. The reaction temperature rose to the highest level of 30° C. When the reaction was continued for additional one hour after the completion of this addition, the conversion of tetrafluorophthalonitrile reached 99.0%. The resultant reaction solution was filtered to separate a solid component. The solid component was evaporated under a reduced pressure at 50° C. to obtain about 15 g of 2-butanone by distillation. 100 ml of methanol was added to the resultant residue of the distillation to precipitate crystals. When the crystals consequently precipitated were filtered, 11.4 gr (0.035 mol, yield: 70.2 mol %) of 4-(2-chloro phenylthio)-3,5,6-trifluorophthalonitrile was obtained.

Example 11

Synthesis of dodecafluorotetrakis(2-chlorophenylthio)vanadylphthalocyanine

Into a four-neck flask of glass provided with a stirrer, a thermometer, a water separation tube, and a cooling tube and having an inner volume of 100 ml, a nitrogen gas was introduced at a rate of 100 ml/min for 10 minutes to replace the interior of the reaction vessel with the nitrogen gas. Then, the reaction vessel was charged with 11.4 gr (0.035 mol) of 4-(2-chloro phenylthio)-3,5,6-trifluoro-phthalonitrile synthesized in Referential Example 2, 10 gr (0.077 mol) of n-octanol, 30 gr (0.29 mol) of benzonitrile, and 2.07 gr (0.013 mol) of vanadium trichloride. Again, a nitrogen gas was introduced at a rate of 100 ml/min for 10 minutes into the reaction vessel to replace the interior thereof with the nitrogen gas. When the oxygen concentration in the reaction vessel was determined with an oxygen concentration meter, it was found to be 1.1 mol %. The reaction mixture in the reaction vessel was continuously stirred under a current of nitrogen having a flow rate of 30 ml/min, heated to 190° C. for one hour, left reacting for 3 hours, and cooled to room temperature. The linear speed of the gas at the inlet part (the connecting part between the reaction vessel and the cooling tube) was 0.6 cm/sec and the oxygen concentration in the reaction vessel was measured with an oxygen concentration meter, to find to be 1.1 vol %. The conversion of 4-(2-chloro phenylthio)-3,5,6-trifluorophthalonitrile was determined by liquid chromatography, to find to be 99.3%. 20 gr of benzonitrile was added to the reaction slurry and the resultant mixture was filtered to separate a solid component. The solid component was washed with 30 gr of benzonitrile. The filtrate was placed in 300 ml of methanol with stirred and left standing for one hour. The precipitate consequently formed was filtered. The residue of the filtration was washed with 50 ml of acetonitrile and dried under a reduced pressure at 60° C. for 12 hours. The weight of the target product, dodecafluorotetrakis(2-chlorophenylthio)vanadylphthalocyanine, as calculated from the weight after the drying, was 9.8 gr (yield: 82.2 mol %).

Referential Example 3

Synthesis of 4,5-bis(2-chloro phenylthio)-3-fluoro-6-(2,6-dimethylphenoxy)phthalocyanine Into a four-neck flask of glass provided with a stirrer, a thermometer, a water separation tube, and a cooling tube and having an inner volume of 100 ml, 30 gr of 2-butanone, 10 gr (0.05 mol) of tetrafluorophthalonitrile, and 7.26 gr (0.125 mol) of potassium fluoride were placed and the flask was dipped in a water bath. 15.2 g (0.105 mol) of 2-chlorobenzene thiol was added to the reaction mixture with stirred at room temperature over about 40 minutes. The reaction temperature rose to the maximum of about 35° C. When the reaction was continued for additional one hour after the completion of this addition, the conversion of tetrafluorophthalonitrile reached 99.2%. The content of the bisthiol moiety, 4,5-bis(2-chloro phenylthio)-3,6-difluorophthalonitrile, a determined by liquid chromatography, was 92.5%. Then, 7.33 gr (0.06 mol) of 2,6-xylenol, 4.35 gr (0.075 mol) of potassium fluoride and and 6 gr of 2-butanone were added to the reaction mixture in the reaction vessel and the resultant mixture was heated to a temperature in the range of 83-86° C., and then left reacting under reflux for 30 hours. The conversion of 4,5-bis(2-chloro phenylthio)-3,6-difluorophthalonitrile after the completion of the reaction was determined by liquid chromatography, to find to be 99.8% and the content of the target product, 4,5-bis(2-chloro phenylthio)-3-fluoro-6-(2,6-dimethylphenoxy) phthalonitrile, as determined by liquid chromatography, was 70%. The reaction slurry was cooled to room temperature and filtered to separate a solid component. The filtrate consequently formed was separated. The resultant cake was washed with about 200 ml of chloroform. By evaporating the washing under a reduced pressure at 50° C., 18.0 g (0.0326 mol, yield: 65.2 mol % based on tetrafluoronitrile) of 4,5-bis(2-chloro phenylthio)-3-(2,6-dimethylphenoxy)-6-fluorophthalonitrile was obtained.

Example 12

Synthesis of 4,5-octakis(2-chloroplhenylthio)-3,6-(tetrakis(2,6-dimethylphenoxy)-tetrafluoro)vanadylphthalocyanine Into a four-neck flask of glass provided with a stirrer, a thermometer, a water separation tube, and a cooling tube and having an inner volume of 100 ml, a nitrogen gas was introduced at a rate of 100 ml/min for 10 minutes to replace the interior of the reaction vessel with the nitrogen gas. Then, the reaction vessel was charged with 18 gr (0.0326 mol) of 4,5-bis(2-chloro phenylthio)-3-(2,6-dimethylphenoxy)-6-fluorophthalonitrile syntheized in Referential Example 3, 10 gr (0.077 mol) of n-octanol, 30 gr (0.29 mol) of benzonitrile, and 1.92 gr (0.012 mol) of vanadium trichloride. Again, a nitrogen gas was introduced at a rate of 100 ml/min for 10 minutes into the reaction vessel to replace the interior thereof with the nitrogen gas. When the oxygen concentration in the reaction vessel was determined with an oxygen concentration meter, it was found to be 1.1 vol %.

The reaction mixture in the reaction vessel was continuously stirred under a current of nitrogen having a flow rate of 30 ml/min, heated to 190° C. for one hour, left reacting for 3 hours, and cooled to room temperature. The linear speed of the gas at the inlet part (the connecting part between the reaction vessel and the cooling tube) was 0.6 cm/sec and the oxygen concentration in the reaction vessel was measured with an oxygen concentration meter, to find to be 1.1 vol %. The conversion of 4,5-bis(2-chloro phenylthio)-3-(2,6-dimethylphenoxy)-6-fluorophthalonitrile was determined by liquid chromatography, to find to be 98.4%. 20 gr of benzonitrile was added to the reaction slurry and the resultant mixture was filtered to separate a solid component. The solid component was washed with 30 gr of benzonitrile. The filtrate was placed in 300 ml of methanol with stirred and left standing for one hour. The precipitate consequently formed was filtered. The residue of the filtration was washed with 50 ml of acetonitrile and dried under a reduced pressure at 60° C. for 12 hourss. The weight of the target product, 4,5-octakis(2-chloro phenylthio)-3,6-tetrakis((2,6-dimethylphenoxy)-fluoro)vanadylphthalocyanine, as calculated from the weight after the drying, was 15.5 gr (yield: 83.4 mol).

Example 13

The reaction and the purification were carried out by following the procedure of Example 12 while using 10 gr (0.069 mol) of 2-naphthol in place of n-octanol. As the result, the weight of the target product, 4,5-octakis(2-chloro phenylthio)-3,6-tetrakis((2,6-dimethylphenoxy)-fluoro)vanadylphthalocyanine, as calculated from the weight after the drying, was 14.5 gr (yield: 77.8 mol %).

Example 14

The reaction and the purification were carried out by following the procedure of Example 12 while carrying out the cyclization by using 1.2 gr (0.006 mol) of cuprous chloride in place of 1.92 gr of vanadium trichloride. As a result, the weight of the target product, 4,5-octakis(2-chloro phenylthio)-3,6-tetrakis((2,6-dimethylphenoxy)-fluoro)copperphthalocyanine, as calculated from the weight after the drying, was 15.7 gr (yield: 84.9 mol).

Example 15

The cyclization was carried out by following the procedure of Example 4 while using 28.6 gr (0.39 mol) of N,N-dimethyl formamide in place of benzonitrile. When the oxygen concentration in the reaction vessel was determined with an oxygen concentration meter, it was found to be 1.3 vol %. As a result, the conversion of tetrafluorophthalonitrile was determined by liquid chromatography, to find to be 98.7%. The reaction slurry resulting from the cyclization was filtered to separate a solid component. The solid component was washed with 300 gr of dimethyl formamide, then washed with 100 gr of methanol, and dried under a reduced pressure at 150° C. for 12 hours.

The weight of the target product, hexadecafluorovanadylphthalocyanine, as calculated from the weight after the drying, was 27.2 gr (yield: 83.7 mol %).

Example 16

The cyclization was carried out by following the procedure of Example 4 while changing the flow rate of nitrogen gas introduced during the course of the reaction to 1 ml/min (the linear speed of 0.02 cm/sec at the lower part of the cooling tube of the outlet of the reaction vessel). The conversion of tetrafluorophthalonitrile was determined by liquid chromatography, to find to be 98.1%. The oxygen concentration in the reaction vessel at this time was measured with an oxygen concentration meter, to find to be 2.6 vol %. The reaction slurry resulting from the cyclization was filtered to separatae a solid component. The solid component was washed with benzonitrile, then washed with 100 gr of methanol, and dried under a reduced pressure at 150° C. for 12 hours.

The weight of the target product, hexadecafluorovanadylphthalocyanine, as calculated from the weight after the drying, was 28.8 g (yield: 88.5 mol %).

Example 17

The cyclization was carried out by following the procedure of Example 4 while changing the flow rate of nitrogen introduced during the course of the reaction to 60 ml/min (the linear speed of 1.2 cm/sec at the lower part of the cooling tube of the outlet of the reaction vessel). The conversion of tetrafluorophthalonitrile was determined by liquid chromatography, to find to be 99.7%. The oxygen concentration in the reaction vessel at this time was measured with an oxygen concentration meter, to find to be 0.9 vol %. The reaction slurry resulting from the cyclization was filtered to separatae a solid component. The solid component was washed with benzonitrile, then washed with 100 gr of methanol, and dried under a reduced pressure at 150° C. for 12 hours. The weight of the target product, hexadecafluorovanadylphthalocyanine, as calculated from the weight after the drying, was 29.3 g (yield 90.2 mol %).

Example 18

Into a four-neck flask of glass provided with a stirrer, a thermometer, a water separation tube, and a cooling tube and having an inner volume of 100 ml, a nitrogen gas was introduced at a rate of 100 ml/min for 10 minutes to replace the interior of the reaction vessel with the nitrogen gas. Then, the reaction vessel was charged with 9 gr (0.0163 mol) of 4,5-bis (2-chloro phenylthio)-3-(2,6-dimethylphenoxy)-6-fluorophthalonitrile synthesized in Referential Example 3, 3.3 gr (0.0163 mol) of tetrafluorophthalonitrile, 10 gr (0.077 mol) of n-octanol, 30 gr (0.29 mol) of benzonitrile, and 1.92 gr (0.012 mol) of vanadium trichloride. Again, a nitrogen gas was introduced at a rate of 100 ml/min for 10 minutes into the reaction vessel to replace the interior thereof with the nitrogen gas. When the oxygen concentration in the reaction vessel was determined with an oxygen concentration meter, it was found to be 1.1 mol %. The reaction mixture in the reaction vessel was continuously stirred under a current of nitrogen having a flow rate of 30 ml/min, heated to 190° C. for one hour, left reacting for 3 hours, and cooled to room temperature. The linear speed of the gas at the inlet part (the connecting part between the reaction vessel and the cooling tube) was 0.6 cm/sec and the oxygen concentration in the reaction vessel was measured with an oxygen concentration meter, to find to be 1.4 vol %. The conversions of 4,5-bis(2-chloro phenylthio)-3-(2,6-dimethylphenoxy)-6-fluorophthalonitrile and tetrafluorophthalonitrile were determined by liquid chromatography, to find to be 98.4% and 99.8%, respectively. 20 gr of benzonitrile was added to the reaction slurry and the resultant mixture was filtered to separate a solid component. The solid component was washed with 30 gr of benzonitrile. The filtrate was placed in 500 ml of methanol with stirred and left standing for one hour. The precipitate consequently formed was filtered. The residue of the filtration was washed with 50 ml of acetonitrile and dried under a reduced pressure at 60° C. for 12 hours. The weight of what was inferred to be 4,5-tetrakis(2-chloro phenylthio)-3-bis(2,6-dimethylphenoxy)-6-decafluoro)vanadylphthalocyanine, when calculated from the weight after drying, was found to be 10.9 gr (yield: 85.1 mol).

Example 19

The product, 4,5-tetrakis(2-chloro phenylthio)-3-bis(2,6-dimethylphenoxy)-decafluoro)vanadylphthalocyanine, to be produced folloing the cyclization in Example 18, was used in the following reaction in the same reaction vessel as used in Example 18 without any purification thereof, for the purpose of further converting the fluorine of the phthalocyanine to the anilino group.

The reaction solution resulting from the cyclization was cooled to 150° C. The cooled reaction solution, 26.9 gr (0.29 mol) of aniline and 3.5 gr (0.035 mol) of calcium carbonate as a corrosion inhibitor added thereto were left reacting at 90° C. for 8 hours. 27.5 gr of benzonitrile was added to the reaction solution consequently obtained and the resulting mixture was cooled to room temperature, and filtered to separate a solid component. The resultant filtrate was placed in 1 L of methanol to induce the precipitation of the target product. The precipitate was separated by filtration, washed with acetonitrile, and dried under a reduced pressure at 60° C. for 12 hours. The weight of what was thought to be the target product, 4,5-tetrakis((2-chloro phenylthio)-anilino)-3-bis(2,6-dim ethylphenoxy)-6-tetrafluoro)vanadylphthalocyanine, as calculated from the weight after drying, was 10.2 gr (yield: 67.5 mol %).

Example 20

When the reaction was performed by following the procedure of Example 8 while using 51.6 gr (0.43 mol) of diethylene glycol monomethyl ether as the solvent for the cyclization in place of n-octanol, the target product, octafluorooctakis(2,5-dichlorophenoxy) copper phthalocyanine was obtained in an amount of 24.7 g (yield: 74.2 mol %).

Example 21

When the reaction was performed by following the procedure of Example 8 while using 51.6 gr (0.48 mol) of benzyl alcohol as the solvent for the cyclization in place of n-octanol, the target product, octafluorooctakid(2,5-dichloroplhenoxy) copperphthalocyanine was obtained in an amount of 25.6 g (yield: 76.9 mol %).

Example 22

When the reaction was performed by following the procedure of Example 12 while changing the amount of n-octanol used as the solvent for the cyclization from 10 gr to 2 gr (0.015 mol), the target product, 4,5-octakis(2-chloro phenylthio)-3,6-tetrakis((2,6-dimethylphenoxy)-fluoro)vanadylphthalocyanine was obtained in an amount of 15.2 gr (yield: 81.8 mol %).

Example 23

The reaction was performed by following the procedure of Example 4 while using 10 gr (0.058 mol) of 1-naphthoeic acid in place of 28.6 gr (0.22 mol) of n-octanol and changing the amount of benzonitrile to 50 gr. The conversion of tetrafluorophthalonitrile was determined by liquid chromatography to find to be 98.8%. The weight of the target product, hexadecafluorovanadylphthalocyanine, as determined from the weight found by filtering the reaction slurry resulting from the cyclization, treating the filtrate in the same manner as in Example 4, and drying the resultant filtrate, was 25.0 gr (yield: 76.9 mol %).

Example 24

The reaction was performed by following the procedure of Example 11 while using 5 gr (0.041 mol) of benzoic acid in place of 10 gr (0.077 mol) of n-octanol and changing the amount of benzonitrile to 50 gr. The conversion of 4-(2-chloro phenylthio)-3,5,6-trifluoro-phthalonitrile was determined by liquid chromatography to find to be 98.7%. The reaction slurry resulting from the cyclization was filtered and the filtrate was treated in the same manner as in Example 11. The weight of the target product, dodecafluorotetrakis(2-chlorophenylthio)vanadylphthalocyaine, as calculated from the weight after drying, was 8.9 gr (yield: 74.7 mol %).

Example 25

The reaction was performed by following the procedure of Example 12 while using 5 gr (0.041 mol) of benzoic acid in place of 10 gr (0.77 mol) of n-octanol and changing the amount of benzonitrile to 50 gr. The conversion of 4,5-bis(2-chloro phenylthio)-3-(2,6-dimethylphenoxy)-6-fluorophthalonitrile was determined by liquid chromatography to find to be 98.5%. The reaction slurry resulting from the cyclization was filtered and subjected to the same treatment as in Example 12. The weight of the target product, 4,5-octakis(2-chloro phenylthio)-3,6-tetrakis((2,6-dimethylphenoxy)-fluoro)vanadylphthalocyanine, as calculated from the weight after drying, was 14.0 gr (yield: 75.3 mol %).

Example 26

Into a separable flask of glass provided with a stirrer, a thermometer, a water separation tube, and a cooling tube and having an inner volume of 300 ml, a nitrogen gas was introduced at a rate of 500 ml/min for 10 minutes to replace the interior of the reaction vessel with the nitrogen gas. Then, the reaction vessel was charged with 30 gr (0.0621 mol) of 3-(2,6-dimethylphenoxy)-4,5-bis(phenylthio)-6-fluorophthalonitrile, 2.93 gr (0.0187 mol) of vanadiumtrichloride (made by Sinko Kagaku K. K.), 2.43 gr (0.0187 mol) of n-octanol, and 42.6 gr of benzonitrile. Again, a nitrogen gas was introduced at a rate of 500 ml/min for 10 minutes into the reaction vessel to replace the interior thereof with the nitrogen gas. When the oxygen concentration in the reaction vessel was determined with an oxygen concentration meter, it was found to be 1.6 vol %.

Under the condition of continued stirring, the reaction mixture in the reaction vessel was exposed to a current of nitrogen gas at a flow rate of 30 ml/min and heated. The linear speed of the gas at the inlet part (the connecting part between the reaction vessel and the cooling tube) was 0.7 cm/sec and the oxygen concentration in the reaction vessel was measured with an oxygen concentration meter to be found to be 1.6 vol %.

The temperature was elevated to 180° C. over two hours, then the reaction was further continued with stirred for four hours. In the meanwhile, the flow of the nitrogen gas was continued. The conversion of 3-(2,6-dimethylphenoxy)-4,5-bis(phenylthio)-6-fluorophthalonitrile was determined by liquid chromatography following four hours, to find to be 99.0%. Then, 90 gr of benzonitrile was added thereto, and cooled to 60° C. Further, 43.4 gr (0.372 mol) of N,N-diethylethlene diamine was added and the resultant mixture was kept stirred at 60° C. for about 6 hours. The reation solution, after being cooled, was filtered and the filtrate was dropped into a mixed solution of acetnitrile and water to form a precipirate. The precipirate was washed with a mixed solution of acetnitrile and water, and vacuum-dried to obtain 28.6 gr (77.3 mol %) of 4,5-octakis(phenylthio)-3,6-tetrakis((2,6-dimethylphenoxy)-N,N-diethylethlene diamino)vanadylphthalocyanine.

Example 27

When the reaction was performed by following the procedure of Example 1 while using 29.55 gr (0.15 mol) of 4,5-dichlorophthalonitrile in place of 30 gr (0.15 mol) of tetrafluorophthalonitrile, the amount of the target product, octachlorovanadylphthalocyanine, was found to be 27.25 gr (yield: 85.0 mol %).

Example 28

The product, octachlorovanadylphthalocyanine, to be produced following the cyclization in Example 27, was used in the following reaction in the same reaction vessel as used in Example 27 without any purification thereof, for the purpose of further converting the chlorine of the phthalocyanine compound to a 4-methylbenzenethiol group. Specifically, the reaction solution resulting from the cyclization was cooled to 80° C. 8.58 gr (0.153 mol) of potassiumhydroxide was added to the cooled reaction solution, to dissolve therein. The resultant solution was cooed to 60° C., and 19.00 gr (0.153 mol) of 4-methylbenzene thiol was added thereto and the resultant mixture was left reacting at 60° C. for 2 hours.

After the completion of the reaction, the reaction mixture was cooled to room temperature. The target product was precipitated by adding 2200 gr of acetonitrile to the cooled mixture. The resultant precipitate was separated by filtration, washed with water until the pH of the filtrate became neutral, washed with methanol, and then dried under a reduced pressure at 60° C. for 12 hours. The weight of the target product, tetrachlorotetrakis(4-methylphenylthio)vanadylphthalocyanine, as calculated from the weight after the drying, was found to be 32.57 g (yield: 71.8 mol).

The results in Examples 1-28 are summarized in Table 1 below.

was determined in this case with an oxygen concentration meter, it was found to be 20.5 vol %.

Comparative Example 3

When the reaction was performed by following the procedure of Example 7 while using 58.6 gr (0.75 mol) of dimethyl

TABLE 1

| Ex. | Organic compound Kind | Amount (mass part per 1 mass part of phthalonitrile) | Inert solvent and/or aprotic organic solvent Kind | Amount (mass part per 1 mass part of organoic compound) | Oxygen concentration (vol %) | Yield (mol %) |
|---|---|---|---|---|---|---|
| 1 | n-octanol | 1.95 (=58.6/30) | — | — | 1.8 | 86.4 |
| 2 | diethylene glycol monomethyl ether | 2 (=60/30) | — | — | 1.8 | 71.7 |
| 3 | benzyl alcohol | 1.6 (=48.7/30) | — | — | 1.8 | 78.3 |
| 4 | n-octanol | 0.95 (=28.6/30) | benzonitrile | 1.05 (=30/28.6) | 1.8 | 91.0 |
| 5 | n-octanol | 0.95 (=28.6/30) | 1-chloronaphthalene | 1.05 (=30/28.6) | 1.8 | 88.6 |
| 6 | n-octanol | 0.95 (=28.6/30) | benzonitrile | 1.05 (=30/28.6) | 1.8 | 87.5 |
| 7 | n-octanol | 1.95 (=58.6/30) | — | — | 1.6 | 68.7 |
| 8 | n-octanol | 1.5 (=51.6/34.4) | — | — | 1.5 | 79.0 |
| 9 | n-octanol | 1.5 (=51.6/34.4) | — | — | 1.5 | 72.6 |
| 10 | n-octanol | 0.67 (=23/34.4) | benzonitrile | 0.87 (=30/34.4) | 1.5 | 86.8 |
| 11 | n-octanol | 0.88 (=10/11.4) | benzonitrile | 3 (=30/10) | 1.1 | 82.2 |
| 12 | n-octanol | 0.56 (=10/18) | benzonitrile | 3 (=30/10) | 1.1 | 83.4 |
| 13 | 2-naphthol | 0.56 (=10/18) | benzonitrile | 3 (=30/10) | 1.1 | 77.8 |
| 14 | n-octanol | 0.56 (=10/18) | benzonitrile | 3 (=30/10) | 1.1 | 84.9 |
| 15 | n-octanol | 0.95 (=28.6/30) | DMF | 1.05 (=30/28.6) | 1.8 | 83.7 |
| 16 | n-octanol | 0.95 (=28.6/30) | benzonitrile | 1.05 (=30/28.6) | 2.6 | 88.5 |
| 17 | n-octanol | 0.95 (=28.6/30) | benzonitrile | 1.05 (=30/28.6) | 0.9 | 90.2 |
| 18 | n-octanol | 0.81 (=10/9 + 3.3) | benzonitrile | 3 (=30/10) | 1.1 | 85.1 |
| 19 | n-octanol | 0.81 (=10/9 + 3.3) | benzonitrile | 3 (=30/10) | 1.1 | 67.5 |
| 20 | diethylene glycol monomethyl ether | 1.5 (=51.6/34.4) | — | — | 1.5 | 74.2 |
| 21 | benzyl alcohol | 1.5 (=51.6/34.4) | — | — | 1.5 | 76.8 |
| 22 | n-octanol | 0.11 (=2/18) | benzonitrile | 15 (=30/2) | 1.1 | 81.8 |
| 23 | 1-naphthoeic acid | 0.33 (=10/30) | benzonitrile | 5 (=50/10) | 1.8 | 76.9 |
| 24 | n-octanol | 0.44 (=5/11.4) | benzonitrile | 10 (=50/5) | 1.1 | 74.7 |
| 25 | benzoic acid | 0.28 (=5/18) | benzonitrile | 10 (=50/5) | 1.1 | 75.3 |
| 26 | n-octanol | 0.081 (=2.43/30) | benzonitrile | 17.5 (=42.6/2.43) | 1.6 | 77.3 |
| 27 | n-octanol | 1.98 (=58.6/29.55) | — | — | 1.8 | 85.0 |
| 28 | n-octanol | 1.98 (=58.6/29.55) | — | — | 1.8 | 71.8 |

Comparative Example 1

When the reaction was performed by following the procedure of Example 1 while using 58.6 gr (0.41 mol) of methyl naphthalene as a solvent for the cyclization in place of n-octanol, the weight of hexadecafluorovanadyl phthalocyanine was 17.2 gr (yield: 52.9 mol %).

Comparative Example 2

When the reaction was performed by following the procedure of Example 1 while using 58.6 gr (0.41 mol) of methyl naphthalene as a solvent for the cyclization in place of n-octanol, omitting the replacement with a nitrogen gas prior to the reaction and the introduction of a nitrogen gas during the course of the reaction, and supplying air at a flow rate of 5 ml/min to the reaction vessel, the weight of hexadecafluorovanadyl phthalocyanine was found to be 13.5 gr (yield: 41.5 mol %). When the oxygen concentration in the reaction vessel sulfoxide as a solvent for the cyclization in place of n-octanol, the weight of the produced octafluorooctakisanilino vanadyl phthalocyanine was found to be 23.7 gr (yield: 43.5 mol %).

Comparative Example 4

When the reaction was performed by following the procedure of Example 1 while omitting the replacement with a nitrogen gas prior to the reaction and the introduction of a nitrogen gas during the course of the reaction, and supplying air at a flow rate of 30 ml/min to the reaction vessel, the weight of hexadecafluorovanadyl phthalocyanine was found to be 12.5 gr (yield: 38.5 mol %). When the oxygen concentration in the reaction vessel was determined at this time with an oxygen concentration meter, it was found to be 20.3 vol %.

Comparative Example 5

When the reaction was performed by following the procedure of Example 8 while omitting the introduction of a nitrogen gas and supplying air at a flow rate of 30 ml/min during the course of the cyclization, the weight of octaluorooctakis (2,5-dichlorophenoxy)copperphthalycyanine was found to be 16.2 g (yield: 48.6 mol %). When the oxygen concentration in the reaction vessel at this time was determined with an oxygen concentration meter, it was found to be 20.8 vol %.

When the fluorine atom in the phthalocyanine compound thus obtained was converted to benzyl amino in the same manner as in Example 9, the weight of 4,5-octakis(2,5-dichlorophenoxy)-3-tetrakis(benzylamino)copperphthalocyanine was found to be 17.0 gr (yield: 42.1 mol %).

Comparative Example 6

When the reaction was performed by following the procedure of Example 12 while omitting the use of n-octanol and benzonitrile for the cyclization, using 40 gr (0.28 mol) of methyl naphthalene instead, and supplying air at a flow rate of 30 ml/min to the reaction vessel, the weight of 4,5-octakis(2-chloro phenylthio)-3,6-tetrakis((2,6-dimethylphenoxy)-fluoro)vanadylphthalocyanine was found to be 8.53 gr (yield: 45.9 mol %). When the oxygen concentration in the reaction vessel was determined at this time with an oxygen concentration meter, it was found to be 20.7 vol %.

Comparative Example 7

When the reaction was performed by following the procedure of Example 4 while changing the amount of n-octanol to 0.1 gr (0.003 mass part based on one mass part of the phthalonitrile compound as the raw material), the conversion of tetrafluorophthalonitrile, as determined by liquid chromatography, was found to be 25.7%, indicating that the cyclization was hardly carried out.

Comparative Example 8

The reaction was performed by following the procedure of Example 12 while changing the amount of 4,5-bis(2-chloro phenylthio)-3-(2,6-dimethylphenoxy)-6-fluorophthalonitrile to 1.8 gr (0.033 mol), and using 36 gr of n-octanol (20 mass parts based on one mass part of the phthalonitrile compound as the raw material) in place of a mixed solvent of n-octanol and benzonitrile. After the cyclization, the conversion of 4,5-bis(2-chloro phenylthio)-3-(2,6-dimethylphenoxy)-6-fluorophthalonitrile, as determined by liquid chromatography, was found to be 45.8%, indicating that the cyclization was hardly carried out. Further, the spectrum of the resultant phthalocyanine compound by the UV determination was significantly different from that of the phthalocyanine compound obtained in Example 12, indicating that the cyclization in this Comparative Example did not normally proceed.

Comparative Example 9

The cyclization was performed by following the procedure of Example 12 while omitting the introduction of a nitrogen gas in the reaction vessel during the course from the time when the raw materials were placed to the time when the reaction was completed. After the cyclization, the conversion of 4,5-bis(2-chloro phenylthio)-3-(2,6-dimethylphenoxy)-6-fluorophthalonitrile, as determined by liquid chromatography, was found to be 68.1%. Further, the purification was performed by following the procedure of Example 12 by using methanol and acetonitrile, to obtain 4,5-octakis(2-chloro phenylthio)-3,6-tetrakis((2,6-dimethylphenoxy)-fluoro)vanadylphthalocyanine in the weight of 7.2 gr (yield: 38.7 mol %).

The entire disclosure of Japanese Patent Application No. 2004-072003 filed on Mar. 15, 2004 including specification, claims, drawings and summary are incorporated herein by reference in its entirety.

The invention claimed is:

1. A method for the production of a halogen-containing phthalocyanine compound represented by the following formula (5):

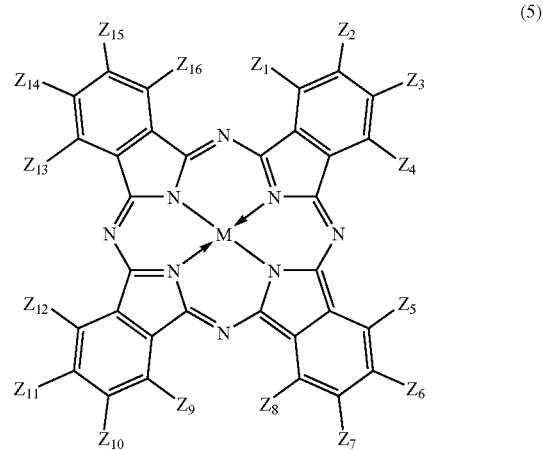

wherein $Z_1$-$Z_{16}$ independently stand for a hydrogen atom, $NHR^1$, $SR^2$, $OR^3$, or a halogen atom, provided that at least one of the $Z_1$- $Z_{16}$ stands for a halogen atom; $R^1$, $R^2$, and $R^3$ independently stand for a phenyl group which may be substituted, an aralkyl group which may be substituted, or an alkyl group of 1 -20 carbon atoms which may be substituted; and M stands for a metal, a metal oxide, or a metal halogenide by subjecting a phthalonitrile compound (1) represented by the following formula (1):

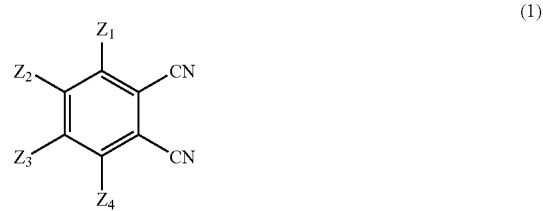

a phthalonitrile compound (2) represented by the following formula (2):

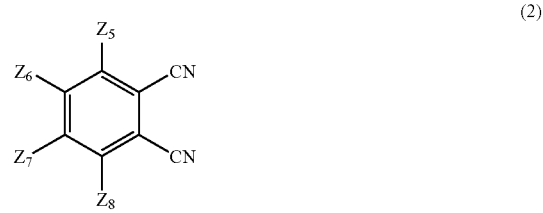

a plithalonitrile compound (3) represented by the following formula (3):

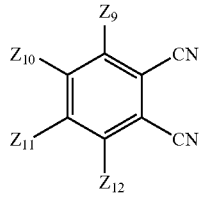
(3)

and a plithalonitrile compound (4) represented by the following formula (4):

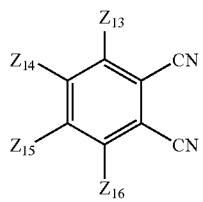
(4)

wherein in the formulae (1)-(4), $Z_1$-$Z_{16}$ independently stand for a hydrogen atom, $NHR^1$, $SR^2$, $OR^3$, or a halogen atom, provided that at least one of the $Z_1$-$Z_{16}$ stands for a halogen atom; $R^1$, $R^2$, and $R^3$ independently stand for a phenyl group which may be substituted, an aralkyl group which may be substituted, or an alkyl group of 1-20 carbon atoms which may be substituted, either singly or in combination with a metal compound to the cyclization, wherein the cyclization is carried out in an organic compound having a hydroxyl group and/or a carboxyl group in an amount of 0.01-10 mass parts based on 1 mass part of the phthalonitrile compounds while introducing an inert gas.

2. A method according to claim 1, wherein the phthalocyanine compound obtained by the cyclization is further substituted with at least one compound selected from the group consisting of amino compounds represented by the formula: $M'$-$NHR^4$, sulfur-containing compounds represented by the formula: $M'$-$SR^5$, and alcohol compounds represented by the formula: $M'$-$OR^6$ (wherein $M'$ stands for a hydrogen atom or an alkali metal atom, and $R^4$, $R^5$, and $R^6$ independently stand for a phenyl group which may be substituted, an aralkyl group which may be substituted, or an alkyl group of 1-20 carbon atoms which may be substituted).

3. A method according to claim 1, wherein the metal compound is at least one member selected from the group consisting of metals, metal oxides, metal carbonyls, metal halogenides, and organic acid metals.

4. A method according to claim 1, wherein the cyclization is carried out in a mixed solvent of the organic compound having a hydroxyl group and/or a carboxyl group with an inert solvent and/or an aprotic organic solvent.

5. A method according to claim 1, wherein the organic compound having a hydroxyl group and/or a carboxyl group is an organic compound of 6-15 carbon atoms.

6. A method according to claim 4, wherein the inert solvent and/or aprotic organic solvent is an aromatic compound having a boiling point of not lower than 150° C.

7. A method according to claim 4, wherein the inert solvent and/or aprotic organic solvent is mixed with the organic compound in an amount in the range of 0.01-50 mass parts, based on 1 mass part of the organic compound.

8. A method according to claim 1, wherein the cyclization is carried out while an inert gas is introduced so that an oxygen concentration in the gas phase part exposed to the reaction solution during the course of the reaction may reach a level of not more than 10 vol%.

9. A method according to claim 1, wherein in the formula (5), $Z_1$, $Z_4$, $Z_5$, $Z_8$, $Z_9$, $Z_{12}$, $Z_{13}$, and $Z_{16}$ are all halogen atoms and, 0 to 8 of $Z_2$, $Z_3$, $Z_6$, $Z_7$, $Z_{10}$, $Z_{11}$, $Z_{14}$, and $Z_{15}$ is a halogen atom.

10. A method according to claim 1, wherein in the formula (5), 1 to 7 of $Z_1$, $Z_4$, $Z_5$, $Z_8$, $Z_9$, $Z_{12}$, $Z_{13}$, and $Z_{16}$ is a halogen atom.

11. A method according to claim 10, wherein in the formula (5), 1 to 4 of $Z_1$, $Z_4$, $Z_5$, $Z_8$, $Z_9$, $Z_{12}$, $Z_{13}$, and $Z_{16}$ is a halogen atom and, 4 of $Z_1$, $Z_4$, $Z_5$, $Z_8$, $Z_9$, $Z_{12}$, $Z_{13}$, and $Z_{16}$ are $OR^3$.

12. A method according to claim 1, the halogen atom in the formula (5) is a fluorine atom or a chlorine atom.

* * * * *